(12) United States Patent
Jo et al.

(10) Patent No.: US 11,520,431 B2
(45) Date of Patent: Dec. 6, 2022

(54) TOUCH DISPLAY SYSTEM PERFORMING GROUND MODULATION

(71) Applicant: SAMSUNG ELECTRONICS CO., LTD., Suwon-si (KR)

(72) Inventors: Yunrae Jo, Yongin-si (KR); Ohkyong Kwon, Seoul (KR); Yoonkyung Choi, Seongnam-si (KR); Jinbong Kim, Yongin-si (KR); Jaehyung Jung, Seoul (KR)

(73) Assignees: Samsung Electronics Co., Ltd., Suwon-si (KR); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 17/348,930

(22) Filed: Jun. 16, 2021

(65) Prior Publication Data
US 2022/0129128 A1 Apr. 28, 2022

(30) Foreign Application Priority Data
Oct. 23, 2020 (KR) .................. 10-2020-0138232

(51) Int. Cl.
*G06F 3/041* (2006.01)
(52) U.S. Cl.
CPC .......... *G06F 3/04162* (2019.05); *G06F 2203/04114* (2019.05)
(58) Field of Classification Search
CPC . G06F 3/041–0444; G06F 2203/04114; G06F 2203/04107
See application file for complete search history.

(56) References Cited

U.S. PATENT DOCUMENTS

| | | | |
|---|---|---|---|
| 10,067,590 B2 | 9/2018 | Reynolds | |
| 10,324,324 B2 | 6/2019 | Kim et al. | |
| 10,459,587 B2 | 10/2019 | Krah et al. | |
| 10,564,771 B2 | 2/2020 | Choi et al. | |
| 10,747,347 B2 | 8/2020 | Jang et al. | |
| 2016/0248894 A1* | 8/2016 | Hosoi | H04M 1/035 |
| 2017/0046004 A1* | 2/2017 | Choi | G06F 3/0446 |
| 2019/0102037 A1 | 4/2019 | Krah | |

(Continued)

FOREIGN PATENT DOCUMENTS

KR 10-2019-0038130 A1 4/2019

*Primary Examiner* — Temesghen Ghebretinsae
*Assistant Examiner* — Ivelisse Martinez Quiles
(74) *Attorney, Agent, or Firm* — Lee IP Law, P.C.

(57) ABSTRACT

A touch display system includes: a display driver integrated circuit (IC) configured to drive a display panel; a touch screen controller configured to drive a touch screen panel; a driving voltage generator configured to provide driving voltages to the display panel, the display driver IC, and the touch screen controller; and a ground modulation device configured to receive a driving signal, which is used to drive the touch screen panel and periodically swings between a first reference voltage level and a second reference voltage level, from the touch screen controller, configured to generate a modulated ground voltage, which periodically swings between the first reference voltage level and the second reference voltage level, based on the driving signal, and configured to provide the modulated ground voltage to the display panel, the display driver IC, and the touch screen controller

18 Claims, 17 Drawing Sheets

(56) References Cited

U.S. PATENT DOCUMENTS

2019/0171320 A1\* 6/2019 Kim .................... G06F 3/03545
2020/0019265 A1 1/2020 Krah et al.
2020/0103992 A1 4/2020 Sauer et al.
2020/0341579 A1 10/2020 Jang et al.

\* cited by examiner

TOUCH DISPLAY SYSTEM PERFORMING GROUND MODULATION

CROSS-REFERENCE TO RELATED APPLICATION

Korean Patent Application No. 10-2020-0138232, filed on Oct. 23, 2020 in the Korean Intellectual Property Office, and entitled: "Touch Display System Performing Ground Modulation," is incorporated by reference herein in its entirety.

BACKGROUND

1. Field

Embodiments relate generally to semiconductor integrated circuits, and more particularly to a touch display system performing a ground modulation.

2. Description of the Related Art

A touch display system includes a display panel and a touch screen panel. The touch screen panel includes an external type (Add on Type) and an embedded type (On Cell/In Cell type) according to a structure of the touch screen panel, and includes a capacitive type, a resistive type, an infrared type, an acoustic type, or a pressure type depending on how the touch screen panel operates.

SUMMARY

Embodiments are directed to a touch display system, including: a display driver integrated circuit (IC) configured to drive a display panel; a touch screen controller configured to drive a touch screen panel; a driving voltage generator configured to provide driving voltages to the display panel, the display driver IC, and the touch screen controller; and a ground modulation device configured to receive a driving signal, which is used to drive the touch screen panel and periodically swings between a first reference voltage level and a second reference voltage level, from the touch screen controller, configured to generate a modulated ground voltage, which periodically swings between the first reference voltage level and the second reference voltage level, based on the driving signal, and configured to provide the modulated ground voltage to the display panel, the display driver IC, and the touch screen controller.

According to example embodiments, a touch display system includes a display system, a touch system, a power management IC and an application processor. The display system may include a display panel and a display driver IC that drives the display panel. The touch system may include a touch screen panel and a touch screen controller that drives the touch screen panel. The power management IC may supply power to the display system and the touch system. The application processor may control the display system, the touch system and the power management IC. The power management IC may include a driving voltage generator and a ground modulation device. The driving voltage generator may provide driving voltages to the display panel, the display driver IC and the touch screen controller. The ground modulation device may receive a driving signal used to drive the touch screen panel and periodically swinging between a first voltage level and a second voltage level from, the touch screen controller. The ground modulation device may generate a modulated ground voltage periodically swinging between a first reference voltage level and a second reference voltage level from the touch screen controller. The ground modulation device may generate a modulated ground voltage periodically swinging between a first reference voltage level and a second reference voltage level based on the driving signal. The ground modulation device may provide the modulated ground voltage to the display panel, the display driver IC and the touch screen controller.

According to example embodiments, a touch display system includes a display driver IC, a touch screen controller, a driving voltage generator and a ground modulation device. The display driver IC may drive a display panel. The touch screen controller may drive a touch screen panel. The driving voltage generator may include a plurality of direct current-direct current (DC-DC) converters and a plurality of capacitors. The driving voltage generator may provide a plurality of driving voltages to the display panel, the display driver IC and the touch screen controller, respectively. The plurality of DC-DC converters may generate the plurality of driving voltages, and the plurality of capacitors may be connected between a ground node and input terminals of the plurality of DC-DC converters. The ground modulation device may receive a driving signal used to drive the touch screen panel and periodically swinging between a first voltage level and a second voltage level from the touch screen controller. The ground modulation device may generate a modulated ground voltage periodically swinging between a first reference voltage level and a second reference voltage level from the touch screen controller. The ground modulation device may generate a modulated ground voltage periodically swinging between a first reference voltage level and a second reference voltage level based on the driving signal. The ground modulation device may provide the modulated ground voltage to a ground node of each of the display panel, the display driver IC and the touch screen controller. The ground modulation device includes a reference voltage generator, a dead time generator and a buffer circuit. The reference voltage generator may receive a first DC voltage and a second DC voltage, and output a constant voltage having the first reference voltage level based on the first DC voltage and the second DC voltage. The dead time generator may generate a first gate control signal and a second gate control signal based on the driving signal. The buffer circuit may output the modulated ground voltage based on the first gate control signal and the second gate control signal.

BRIEF DESCRIPTION OF THE DRAWINGS

Features will become apparent to those of skill in the art by describing in detail example embodiments with reference to the attached drawings in which.

DETAILED DESCRIPTION

Figure 1:
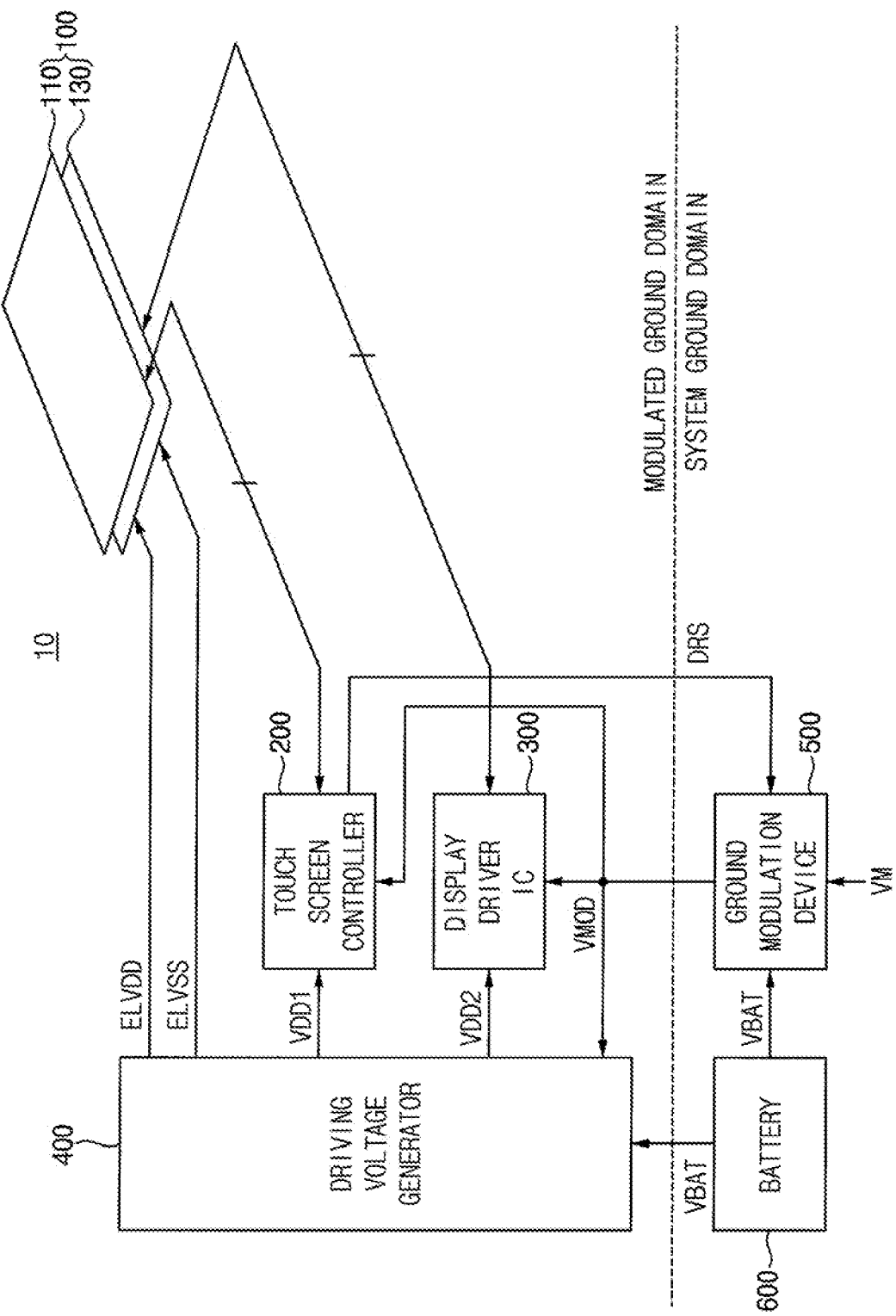
FIG. 1 is a block diagram illustrating a touch display system according to example embodiments.

FIG. 1 is a block diagram illustrating a touch display system according to example embodiments.

Referring to FIG. 1, a touch display system 10 may include a touch display panel 100 including a touch screen panel 110 and a display panel 130, a touch screen controller 200, a display driver integrated circuit (IC) 300, a driving voltage generator 400, and a ground modulation device 500. The touch display system 10 may be connected to a battery 600.

The touch screen panel 110 may respond to a touch input, e.g., user input, applied from outside. In some example embodiments, the touch input may include a direct contact and a proximity contact according to a finger or a touch pen of a user using the touch display system 10. The direct contact may be an action of bringing one of the finger and the touch pen of the user into contact with an upper surface of the touch screen panel 110 exposed to outside. The proximity contact may be an action of bringing one of the finger and the touch pen of the user closer to a position closer than a reference proximity distance, as measured from the upper surface of the touch screen panel 110.

The touch screen panel 110 may generate a touch response signal in response to the touch input, and provide the touch response signal to the touch screen controller 200. In some example embodiments, the touch screen controller 200 may determine whether the touch input has been generated by one of the finger and the touch pen of the user, and may determine a location on the touch screen panel 110 where the touch input has been generated, based on the touch response signal.

The display panel 130 may receive image data provided from the display driver IC 300, and display the image data on the display panel 130. In some example embodiments, the display panel 130 may include a plurality of pixels arranged in rows and columns, and may display the image data in units of columns, and display one frame by displaying from a first column to a last column of the display panel 130 on the display panel 130. In some example embodiments, the plurality of pixels may be connected to a plurality of gate lines and a plurality of data lines, to be connected to the display driver IC 300.

In the present example embodiment, it is assumed that the touch screen panel 110 is implemented in a capacitive type as an embedded type. For example, the touch screen panel 110 may be implemented in an On-Cell type. In some example embodiments, when the touch screen panel 110 is implemented in the On-Cell type, a transmission electrode (Tx electrode) and a reception electrode (Rx electrode) may be formed on the display panel 130. In some example embodiments, the transmission electrode and the reception electrode may be formed on an upper surface of an encapsulation glass.

The touch screen panel 110 may include a plurality of touch electrodes, and the plurality of touch electrodes may be capacitive touch electrodes. The display panel 130 may be implemented as an Organic LED (OLED) display, but example embodiments are not limited thereto. The display panel 130 may be implemented as a liquid crystal display (LCD), a light emitting diode (LED) display, an active-matrix OLED (AMOLED) display, a flexible display and other types of flat panel displays.

The touch screen controller 200 may drive the touch screen panel 110, and the display driver IC 300 may drive the display panel 130. In some example embodiments, the touch screen controller 200 may be integrated with the display driver IC 300 to be implemented as a single IC. In some example embodiments, the touch screen controller 200 may be implemented as a separate IC from the display driver IC 300. In some example embodiments, the touch screen controller 200 may include a plurality of sensing circuits, a selection circuit, a driving circuit, and an analog-to-digital converter (ADC). In some example embodiments, the touch screen controller 200 may further include a control logic circuit and a memory device.

The touch screen controller 200 may be connected to the touch screen panel 110 through a plurality of channels. In this case, the touch screen controller 200 may generate a driving signal DRS for driving the touch screen panel 110 using the driving circuit, and may provide the driving signal DRS to the touch screen panel 110. The driving signal DRS may periodically swing between a first reference voltage level and a second reference voltage level. The touch screen controller 200 may provide the driving signal DRS to the touch screen panel 110 through the plurality of channels, and may receive the touch response signal from the touch screen panel 110.

In some example embodiments, the display driver IC 300 may receive a plurality of data packets from an application processor (AP) (not shown in FIG. 1), and output a horizontal synchronization signal, a vertical synchronization signal, a data activation signal, and the image data based on the plurality of data packets. In this case, the AP and the display driver IC 300 may communicate in one of a mobile industry processor interface (MIPI), a mobile display digital interface (MDDI), and a compact display port (CDP) interface.

The driving voltage generator 400 may provide driving voltages ELVDD, ELVSS, VDD1, and VDD2 to the display panel 130, the touch screen controller 200, and the display driver IC 300 based on a direct-current (DC) voltage VBAT provided from the battery 600. The ground modulation device 500 may receive a plurality of DC voltages VM and VBAT, and may receive the driving signal DRS from the touch screen controller 200.

In some example embodiments, the ground modulation device 500 may generate a modulated ground voltage VMOD based on the plurality of DC voltages VM and VBAT and the driving signal DRS, and may provide the modulated ground voltage VMOD to the driving voltage generator 400, the touch screen controller 200, and the display driver IC 300.

In some example embodiments, the ground modulation device 500 may provide the modulated ground voltage VMOD to a portion of a plurality of nodes included in the driving voltage generator 400. In this case, the ground modulation device 500 may remove parasitic capacitances formed between touch electrodes included in the touch screen panel 110 and the display panel 130 based on the modulated ground voltage VMOD. The ground modulation device 500 may provide a current to the driving voltage generator 400. Additional details will be described below with reference to FIGS. 2 and 18. The current provided to the driving voltage generator 400 may have a magnitude substantially the same as that of a current output from the driving voltage generator 400 to the ground modulation device 500.

Each of the components 100, 110, 130, 200, 300, 400, 500, and 600 of the touch display system 10 may operate based on different ground voltages. In some example embodiments, first ones of the components 100, 110, 130, 200, 300, and 400 may operate based on a first ground voltage, and second ones of the components 500 and 600 may operate based on a second ground voltage. The first ones of the components 100, 110, 130, 200, 300, and 400 may operate based on the modulated ground voltage VMOD. The second ones of the components 500 and 600 may operate based on a system ground voltage, which may be referred to as 'a chassis ground voltage'. In this case, the first ones of the components 100, 110, 130, 200, 300, and 400 may be referred to as operating in a modulated ground domain, and the second ones of the components 500 and 600 may be referred to as operating in a system ground domain.

Figure 2:
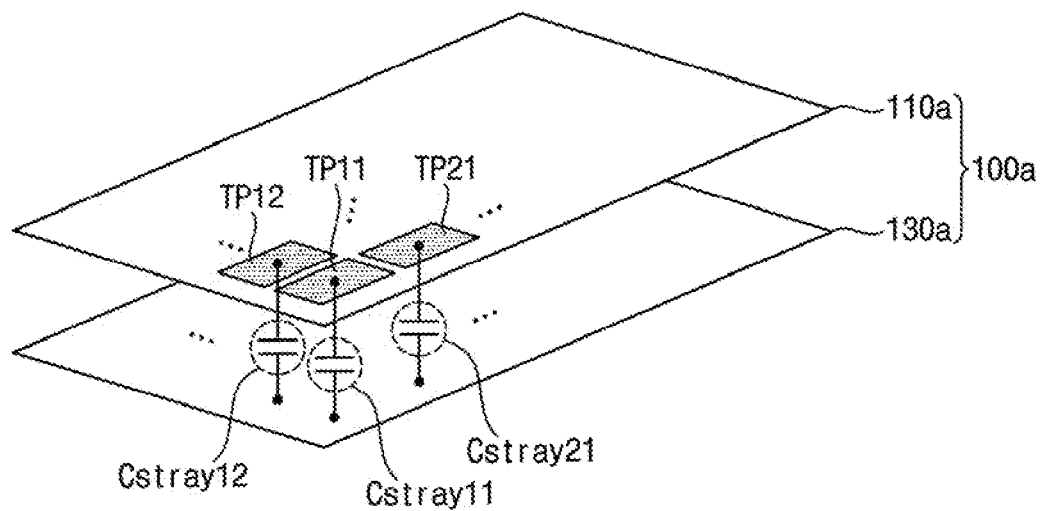
FIG. 2 is a diagram for describing parasitic capacitances formed between a touch screen panel and a display panel in FIG. 1.

FIG. 2 is a diagram for describing parasitic capacitances formed between a touch screen panel and a display panel in FIG. 1.

As describe above with reference to FIG. 1, a touch screen panel 110 may be implemented in a capacitive type as an embedded type. For example, the touch screen panel 110 may be implemented in an On-Cell type. In this case, the touch screen panel 110 may include a cover plastic, an optically clear adhesive (OCA), a polarizer, a plurality of touch electrodes, and an encapsulation glass.

The touch screen panel 110 may be stacked on a cathode electrode positioned on the display panel. For example, the encapsulation glass may be stacked on the cathode electrode, the plurality of touch electrodes may be stacked on the encapsulation glass, and a first OCA may be stacked on the plurality of touch electrodes. The polarizer may be stacked on the first OCA, a second OCA may be stacked on the polarizer, and the cover plastic may be stacked on the second OCA.

Referring to FIG. 2, a touch display panel 100a including a touch screen panel 110a and a display panel 130a is illustrated. The touch screen panel 110a may include a plurality of touch electrodes. In FIG. 2, first to third touch electrodes TP11, TP12, and TP21 are illustrated as the plurality of touch electrodes, but the number and arrangement of the plurality of touch electrodes are merely an example for convenience of description.

In some example embodiments, each of the plurality of touch electrodes may have the same shape and size, and may be arrange uniformly in a row direction, e.g., a direction from TP11 to TP12, and a column direction, e.g., a direction from TP11 to TP21.

In some example embodiments, the touch screen panel 110a may be driven as one of a self capacitive type and a mutual capacitive type. When the touch screen panel 110a is driven as the self capacitive type, each of the plurality of touch electrodes may form a dot sensor. When the touch screen panel 110a is driven as the mutual capacitive type, each of the plurality of touch electrodes may form a line sensor.

In some example embodiments, the plurality of touch electrodes may be formed on a transparent substrate. The transparent substrate may be formed of a polyethylene terephthalate (PET), a polycarbonate (PC), a polymethyl methacrylate (PMMA), a polyethylene naphthalate (PEN), a polyether sulfone (PES), a cyclic olefin polymer (COC), a triacetylcellulose (TAC) film, a polyvinyl alcohol (PVA) film, a polyimide (PI) film, a polystyrene (PS) film, glass, tempered glass, or the like. Each of the plurality of touch electrodes may be formed of various conductive materials such as an indium tin oxide (ITO), a zinc oxide (ZnO), a metal mesh, a graphene, a carbon nanoparticle, a silver nano wire, or the like.

As thickness of the touch display panel 100a including the touch screen panel 110a and the display panel 130a decreases, power consumption by the touch display panel 100a may increase and touch sensitivity may decrease. In the touch display panel 100a implemented in the On-Cell type, parasitic capacitances Cstray11, Cstray12, and Cstray21 may be formed between the touch electrodes TP11, TP12, and TP21 and the cathode electrode of the display panel 130a. In this case, as each of the parasitic capacitances Cstray11, Cstray12, and Cstray21 is periodically charged and discharged based on the driving signal provided to the touch screen panel 110a, the amount of power consumed in the touch display panel 100a may increase. As an amount of each of the parasitic capacitances Cstray11, Cstray12, and Cstray21 increases, values of a capacitance formed between each of the first to third touch electrodes TP11, TP12, and TP21 and the user's finger or touch pen may be relatively reduced, and thus the touch sensitivity may be reduced.

Figure 3:
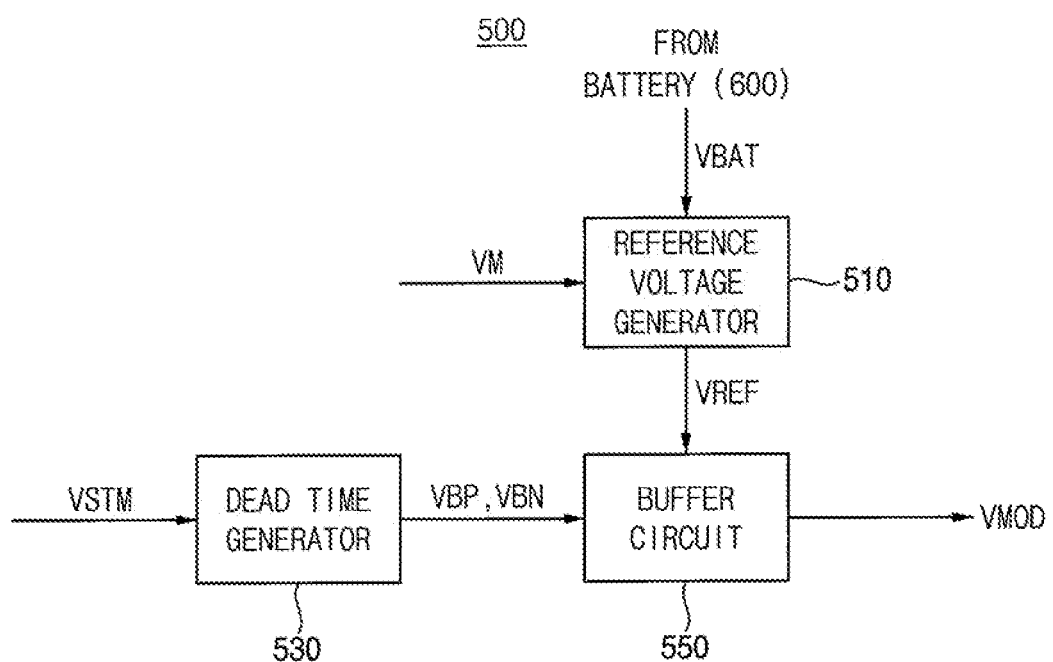
FIG. 3 is a block diagram illustrating an example of a ground modulation device in FIG. 1.

FIG. 3 is a block diagram illustrating an example of a ground modulation device in FIG. 1.

Referring to FIGS. 1, 2, and 3, a ground modulation device 500 may include a reference voltage generator 510, a dead time generator 530, and a buffer circuit 550.

The reference voltage generator 510 may receive a first DC voltage VM and a second DC voltage VBAT, and output a constant voltage VREF based on the first DC voltage VM and the second DC voltage VBAT. In some example embodiments, the first DC voltage VM may be received from outside, and the second DC voltage VBAT may be received from the battery 600. When a driving signal DRS periodically swings between a first reference voltage level and a second reference voltage level, the first DC voltage VM may have a voltage level substantially the same as the first reference voltage level, which is greater than the second reference voltage level, but example embodiments are not limited thereto. The first DC voltage VM may have a voltage level corresponding to a multiple of the first reference voltage level.

In some example embodiments, the first DC voltage VM may be provided from an application processor. In some example embodiments, the first DC voltage VM may be provided from one of the driving voltage generator 400, the touch screen controller 200, and the display driver IC 300. In some example embodiments, the constant voltage VREF may have a voltage level substantially the same as the first reference voltage level, but example embodiments are not limited thereto.

The dead time generator 530 may receive the driving signal DRS from the touch screen controller 200. The dead time generator 530 may generate a first gate control signal VBP and a second gate control signal VBN based on the driving signal DRS. In some example embodiments, the dead time generator 530 may include a plurality of clock generators, and may generate the first gate control signal VBP and the second gate control signal VBN using each of the plurality of clock generators.

The buffer circuit 550 may receive the constant voltage VREF from the reference voltage generator 510, and receive the first gate control signal VBP and the second gate control signal VBN from the dead time generator 530. The buffer circuit 550 may generate a modulated ground voltage VMOD based on the constant voltage VREF, the first gate control signal VBP, and the second gate control signal VBN. In some example embodiments, the modulated ground voltage VMOD may periodically swing between the first reference voltage level and the second reference voltage level of the driving signal DRS with a frequency substantially the same as a frequency of the driving signal DRS. In some example embodiments, the modulated ground voltage VMOD may periodically swing between a third reference voltage level and the second reference level at the same frequency as the frequency of the driving signal DRS. The third reference voltage level may be higher or lower than the first reference voltage level.

In some example embodiments, the modulated ground voltage VMOD may be provided to the touch display panel 100, the touch screen controller 200, and the display driver IC 300. For example, the modulated ground voltage VMOD may be provided to a ground node of each of the touch display panel 100, the touch screen controller 200, and the display driver IC 300. In this case, the touch display panel 100, the touch screen controller 200, and the display driver IC 300 may operate on the modulated ground domain described above with reference to FIG. 1.

Figure 4:
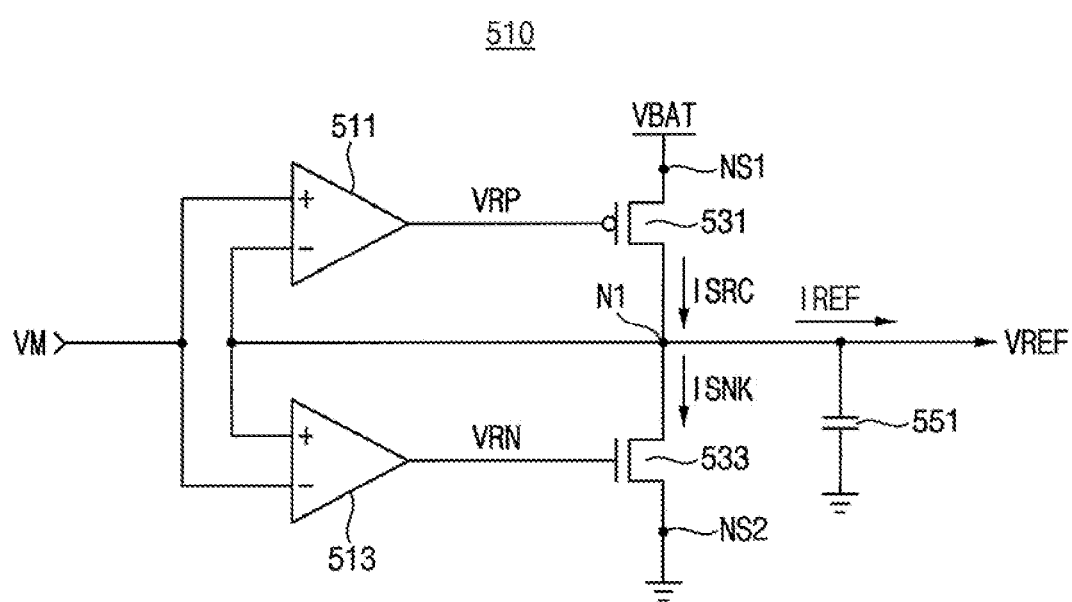
FIG. 4 is a circuit diagram illustrating an example of a reference voltage generator in FIG. 3.

FIG. 4 is a circuit diagram illustrating an example of a reference voltage generator in FIG. 3.

Referring to FIGS. 3 and 4, a reference voltage generator 510 may include a plurality of operational amplifiers 511 and 513, a p-type metal oxide semiconductor (PMOS) transistor 531, an n-type metal oxide semiconductor (NMOS) transistor 533, and a capacitor 551. The plurality of operational amplifiers 511 and 513 may include a first operational amplifier 511 and a second operational amplifier 513.

The first operational amplifier 511 may receive a first DC voltage VM and a voltage of a first node N1. The first operational amplifier 511 may amplify a difference between the first DC voltage VM and the voltage of the first node N1 to generate a third gate control signal VRP, and output the third gate control signal VRP to the PMOS transistor 531.

The second operational amplifier 513 may receive the first DC voltage VM and the voltage of the first node N1. The second operational amplifier 513 may amplify a difference between the first DC voltage VM and the voltage of the first node N1 to generate a fourth gate control signal VRP, and output the fourth gate control signal VRN to the NMOS transistor 533.

The PMOS transistor 531 may receive the third gate control signal VRP as a gate voltage, and may be connected between a first power node NS1 and the first node N1. In some example embodiments, a second DC voltage VBAT may be applied to the PMOS transistor 531 through the first power node NS1.

The NMOS transistor 533 may receive the fourth gate control signal VRN as a gate voltage, and may be connected between a second power node NS2 and the first node N1. In some example embodiments, a system ground voltage may be applied through the second power node NS2.

The capacitor 551 may be connected between the first node N1 and the second power node NS2.

Figure 5:
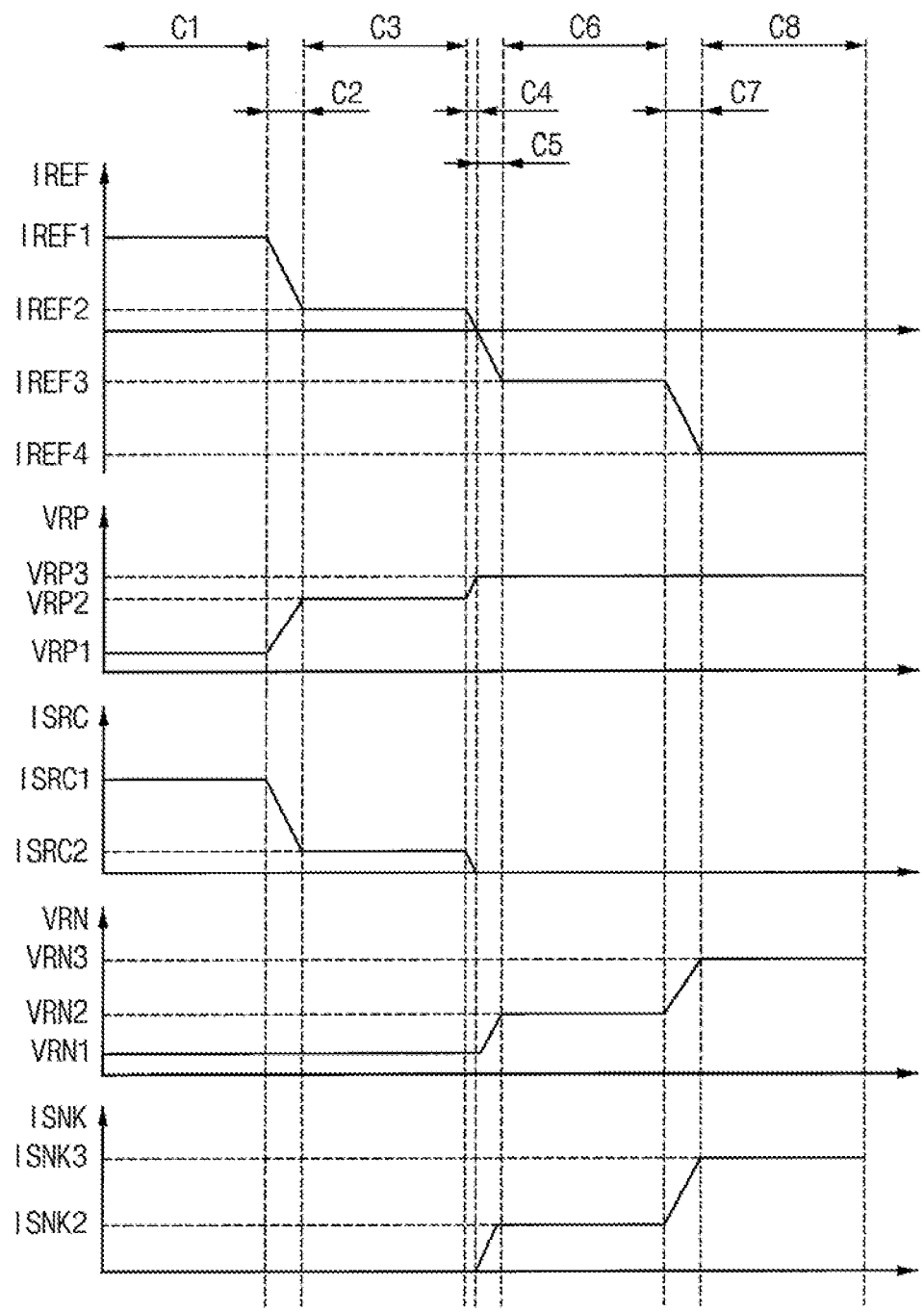
FIG. 5 is a diagram for describing an operation of a reference voltage generator in FIG. 4.

FIG. 5 is a diagram for describing an operation of a reference voltage generator in FIG. 4.

In FIG. 5, a plurality of time periods C1, C2, C3, C4, C5, C6, C7, and C8 are illustrated, and a plurality of currents IREF, ISRC, and ISNK and a plurality of voltages VRP and VRN are illustrated. A length of each of the plurality of time periods C1, C2, C3, C4, C5, C6, C7, and C8 are merely example, and each of the plurality of time periods C1, C2, C3, C4, C5, C6, C7, and C8 may be interpreted as representing an operation period of the reference voltage generator 510 of FIG. 4. The first current IREF may represent a current flowing from a first node N1 to an output node for applying a constant voltage VREF to outside. The second current ISRC may represent a drain current of a PMOS transistor 531. The third current ISNK may represent a drain current of a NMOS transistor 533.

Referring to FIGS. 4 and 5, when the first current IREF has a positive current level IREF1 in the first time period C1, the third gate control signal VRP may be adjusted to a voltage level VRP1 that is used to turn on the PMOS transistor 531, and the second current ISRC has a positive current level ISRC1 when the PMOS transistor 531 is turned on. In this case, the fourth gate control signal VRN may be adjusted to a voltage level VRN1 that is used to turn off the NMOS transistor 533, and the third current ISNK does not flow when the NMOS transistor 533 is turned off.

When the first current IREF has a positive current level IREF2 in the third time period C3, the third gate control signal VRP may be adjusted to a voltage level VRP2 that is used to turn on the PMOS transistor 531, and the second current ISRC has a positive current level ISRC2 when the PMOS transistor 531 is turned on. In this case, the fourth gate control signal VRN may maintain the voltage level VRN1 that is used to turn off the NMOS transistor 533, and the third current ISNK does not flow when the NMOS transistor 533 is turned off.

When the first current IREF has a negative current level IREF3 in the sixth time period C6, the third gate control signal VRP may be adjusted to a voltage level VRP3 that is used to turn off the PMOS transistor 531, and the second current ISRC does not flow when the PMOS transistor 531 is turned off. In this case, the fourth gate control signal VRN may be adjusted to a voltage level VRN2 that is used to turn on the NMOS transistor 533, and the third current ISNK has a positive current level ISNK2 when the NMOS transistor 533 is turned on.

When the first current IREF has a negative current level IREF4 in the eighth time period C8, the third gate control signal VRP may maintain the voltage level VRP3 that is used to turn off the PMOS transistor 531, and the second current ISRC does not flow when the PMOS transistor 531 is turned off. In this case, the fourth gate control signal VRN may be adjusted to a voltage level VRN3 that is used to turn on the NMOS transistor 533, and the third current ISNK has a positive value ISNK3 when the NMOS transistor 533 is turned on.

In each of the time periods C2, C4, C5, and C7, the third gate control signal VRP and the fourth gate control signal VRN may be adjusted to ensure operations of the reference voltage generator 510 in the time periods C1, C3, C6, and C8.

The reference voltage generator 510 operates as described above in the plurality of time periods or operation periods C1, C2, C3, C4, C5, C6, C7, and C8, and thus may operate to stably output the constant voltage VREF regardless of changes of an external environment.

Figure 6:
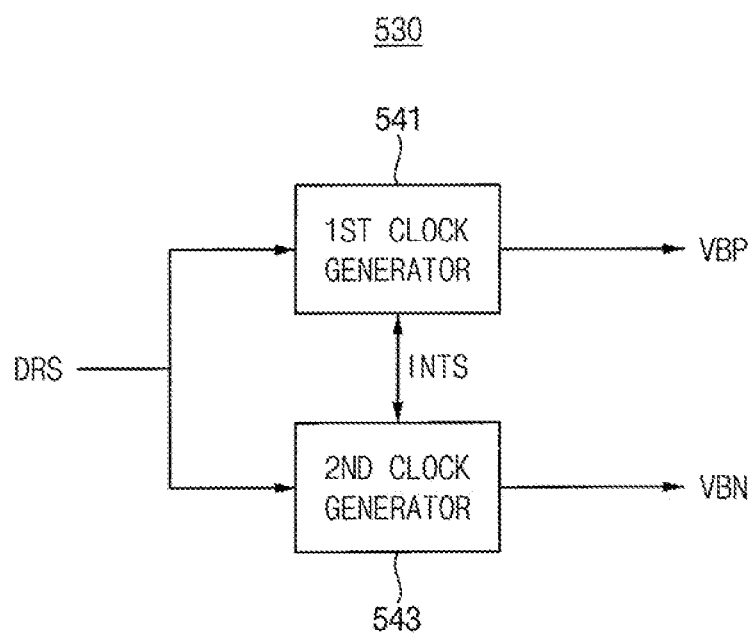
FIG. 6 is a block diagram illustrating an example of a dead time generator in FIG. 3.

FIG. 6 is a block diagram illustrating an example of a dead time generator in FIG. 3.

Referring to FIGS. 1, 3, and 6, a dead time generator 530 may include a first clock generator 541 and a second clock generator 543. The first clock generator 541 and the second clock generator 543 may receive the driving signal DRS from a touch screen controller 200, and generate clock signals based on the driving signal DRS. In some example embodiments, the first clock generator 541 and the second clock generator 543 may generate clock signals having the same frequency.

When the driving signal DRS periodically swings between a first reference voltage level and a second reference voltage level, the first clock generator 541 and the second clock generator 543 have the same frequency as the frequency of the driving signal DRS. In some example embodiments, the first clock generator 541 and the second clock generator 543 may exchange an internal signal INTS, and the first clock generator 541 and the second clock generator 543 may adjust the frequency of the clock signal generated by each of the first clock generator 541 and the second clock generator based on the internal signal INTS.

The first clock generator 541 and the second clock generator 543 may generate clock signals that periodically swing between the same voltage levels as the driving signal DRS. For example, clock signals generated by the first clock generator 541 and the second clock generator 543 may periodically swing between the first reference voltage level and the second reference voltage level.

In some example embodiments, the clock signals generated by the first clock generator 541 and the second clock generator 543 may be provided to the buffer circuit 550 in FIG. 3. The clock signals may be applied as gate signals of MOS transistors included in the buffer circuit 550. In this case, the dead time generator 530 may provide the clock signals to a PMOS transistor and an NMOS transistor included in the buffer circuit (see, e.g., FIG. 7) so that the PMOS transistor and the NMOS transistor are not simultaneously turned on.

In some example embodiments, the clock signal generated by the first clock generator 541 may be referred to as a first gate control signal VBP, and the clock signal generated by the second clock generator 543 may be referred to as a second gate control signal VBN.

The first gate control signal VBP may be provided to the PMOS transistor included in the buffer circuit 550, and the second gate control signal VBN may be provided to the NMOS transistor included in the buffer circuit 550.

Figure 7:
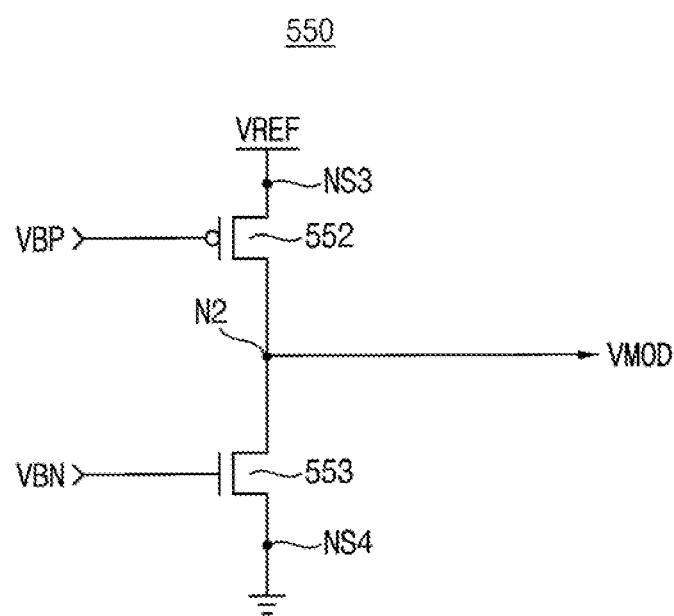
FIG. 7 is a circuit diagram illustrating an example of a buffer circuit in FIG. 3.

FIG. 7 is a circuit diagram illustrating an example of a buffer circuit in FIG. 3.

Referring to FIG. 7, a buffer circuit 550 may include a plurality of MOS transistor2 552 and 553. In some example embodiments, among the plurality of MOS transistor, a first MOS transistor may be implemented as a PMOS transistor 552 and a second MOS transistor may be implemented as an NMOS transistor 553.

The PMOS transistor 552 may receive the first gate control signal VBP as a gate voltage, and may be connected between a second node N2 and a third power node NS3. A constant voltage VREF may be applied to the third power node NS3.

The NMOS transistor 553 may receive the second gate control signal VBN as a gate voltage, and may be connected between the second node N2 and a fourth power node NS4. A system ground voltage may be applied to the fourth power node NS4.

The buffer circuit 550 may output one of the constant voltage VREF and the system ground voltage as a modulated ground voltage VMOD through the second node N2 using the PMOS transistor 552 and the NMOS transistor 553. In some example embodiments, when the first gate control signal VBP corresponds to a logic low level, the buffer circuit 550 may output the constant voltage VREF as the modulated ground voltage VMOD, and when the second gate control signal VBN corresponds to a logic high level, the buffer circuit 550 may output the system ground voltage as the modulated ground voltage VMOD.

Figure 8:
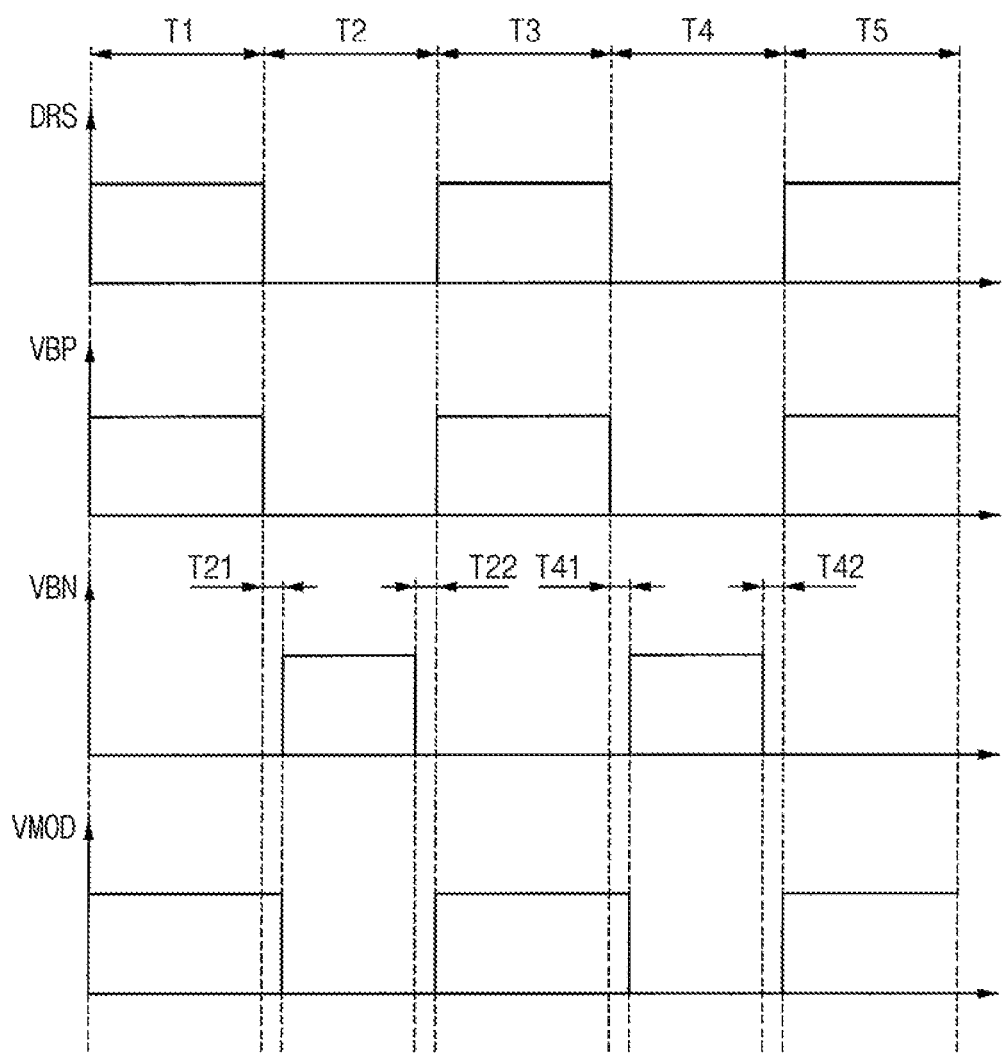
FIG. 8 is a diagram for describing an operation of a dead time generator and a buffer circuit in FIGS. 6 and 7.

FIG. 8 is a diagram for describing an operation of a dead time generator and a buffer circuit in FIGS. 6 and 7.

In FIG. 8, a plurality of time periods T1, T2, T3, T4, and T5 are illustrated, and a plurality of signals DRS and VMOD and a plurality of voltages VBP and VBN are illustrated. A length of each of the plurality of time periods T1, T2, T3, T4, and T5 are merely examples, and each of the plurality of time periods T1, T2, T3, T4, and T5 may be interpreted as representing an operation period of a dead time generator 530 and a buffer circuit 550.

In some example embodiments, when the driving signal DRS transitions from a high level to a low level, a signal level of the first gate control signal VBP may transition from the low level to the high level. For example, the high level may correspond to the first reference voltage level, and the low level may correspond to the second reference voltage level. In this case, a signal level of the second gate control signal VBN may transition from the low level to the high level after a time interval, e.g., T21 and T41, from a time point at which a signal level of the driving signal DRS or the first gate control signal VBP transitions.

In some example embodiments, when the signal level of the driving signal DRS transitions from the low level to the high level, a signal level of the first gate control signal VBP may transition from the high level to the low level. In this case, the signal level of the second gate control signal VBN may transition from the high level to the low level before a time interval, e.g., T22 and T42, from a time point when the signal level of the driving signal DRS or the first gate control signal VBP transitions.

In some example embodiments, the dead time generator 530 may use the internal signal INTS described above with reference to FIG. 6 to generate the first gate control signal VBP and the second gate control signal VBN.

In some example embodiments, when the first gate control signal VBP and the second gate control signal VBN correspond to a low level, e.g., T1, the modulation ground voltage VMOD may transition from the low level to the high level. When the first gate control signal VBP transitions from the low level to the high level and the second gate control signal VBN maintains a low level, e.g., T21, the modulated ground voltage VMOD may still be maintained at the high level. When the first gate control signal VBP maintains the high level and the second gate control signal VBN transitions from the low level to the high level, e.g., a time period excluding a period T21 and a period T22 from a period T2, the modulated ground voltage VMOD may transition from the high level to the low level. When the first gate control signal VBP maintains the high level and the second gate control signal VBN transitions from the high level to the low level, e.g., T22, the modulated ground voltage VMOD may maintain the low level. When the first gate control signal VBP transitions from the high level to the low level and the second gate control signal VBN maintain the low level, e.g., T3, the modulated ground voltage VMOD may transition from the low level to the high level.

FIGS. 9, 10, 11, 12, and 13 are block diagrams illustrating an example of a driving voltage generator in FIG. 1.

In FIGS. 9, 10, 11, 12, and 13, examples 500a, 500b, 500c, and 500d of a ground modulation device and a battery 600 described above with reference to FIG. 1 are illustrated. The examples 500a, 500b, 500c, and 500d of the ground modulation device and the battery 600 perform the same or similar functions as the ground modulation device 500 and the battery 600 in FIG. 1, and thus redundant descriptions will be omitted.

Figure 9:
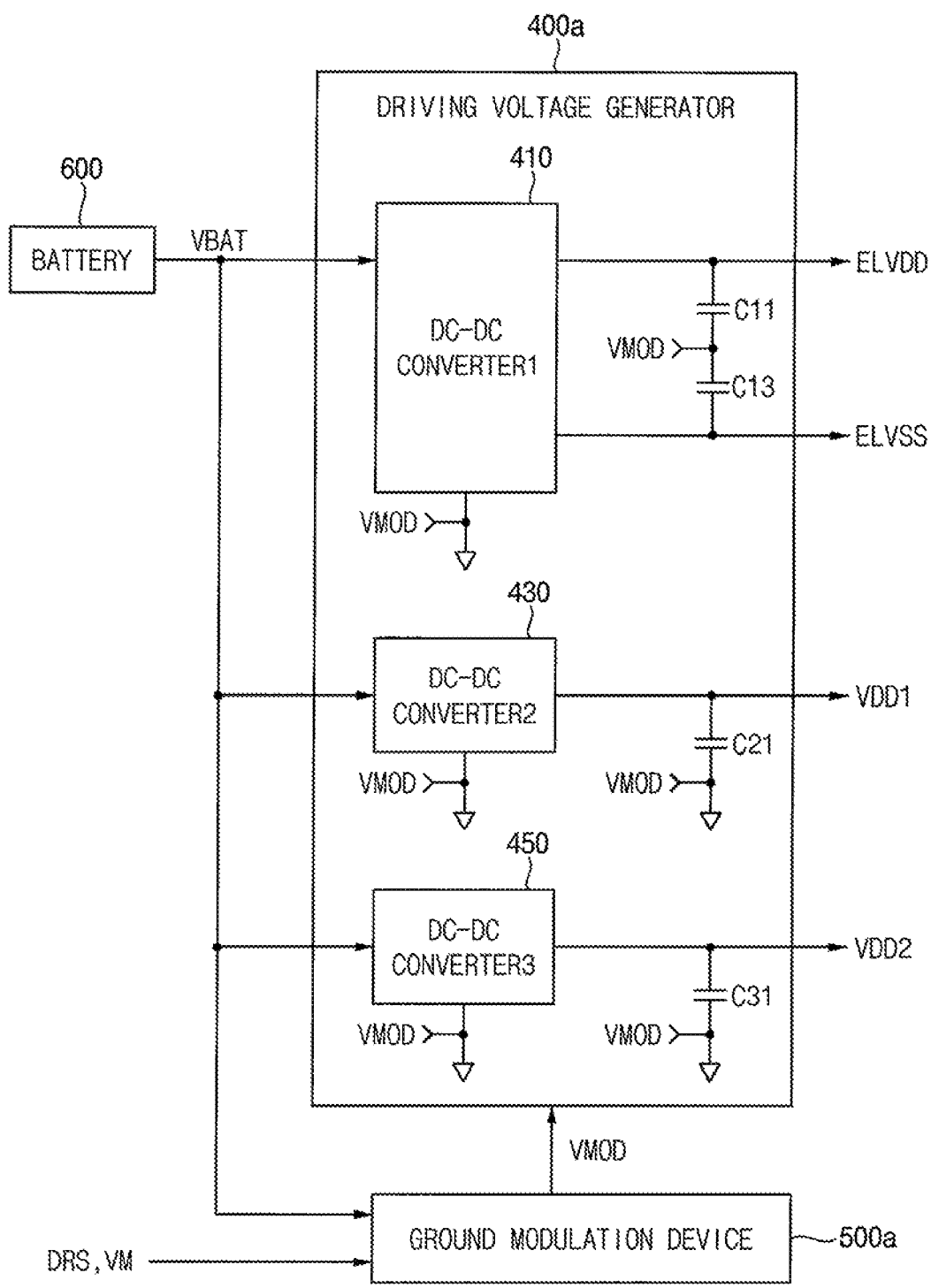
FIGS. 9, 10, 11, 12 and 13 are block diagrams illustrating an example of a driving voltage generator in FIG. 1.

Referring to FIG. 9, a driving voltage generator 400a may include a plurality of DC-DC converters 410, 430, and 450, and a plurality of capacitors C11, C13, C21, and C31. Each of the plurality of DC-DC converters 410, 430, and 450 may be one of a switching regulator and a linear regulator, and convert an input DC voltage, e.g., a DC voltage VBAT provided from the battery 600, to generate an output DC voltage.

In some example embodiments, the first DC-DC converter 410 may generate the driving voltages ELVDD and ELVSS provided to the display panel 130 described above with reference to FIG. 1, the second DC-DC converter 430 may generate the driving voltage VDD1 provided to the touch screen controller 200 described above with reference to FIG. 1, and the third DC-DC converter 450 may generate the driving voltage VDD2 provided to the display driver IC 300 described above with reference to FIG. 1.

The plurality of capacitors C11, C13, C21, and C31 may be connected to output terminals of each of the plurality of DC-DC converters 410, 430, and 450 to remove high-frequency components included in the driving voltages ELVDD, ELVSS, VDD1, and VDD2 output from the plurality of DC-DC converters 410, 430, and 450.

The ground modulation device 500a may provide a modulated ground voltage VMOD to a plurality of nodes included in the driving voltage generator 400a. In some example embodiments, the ground modulation device 500a may provide the modulated ground voltage VMOD to a ground node of each of the plurality of DC-DC converters 410, 430, and 450 and the plurality of capacitors C11, C13, C21, and C31. In this case, the ground modulation device 500a may remove parasitic capacitances formed between touch electrodes included in the touch screen panel 110 and the display panel 130 based on the modulated ground voltage VMOD. The ground modulation device 500a may provide a current to the driving voltage generator 400a. The current provided to the driving voltage generator 400a may have a magnitude substantially the same as that of a current output from the driving voltage generator 400a to the ground modulation device 500a.

Figure 10:
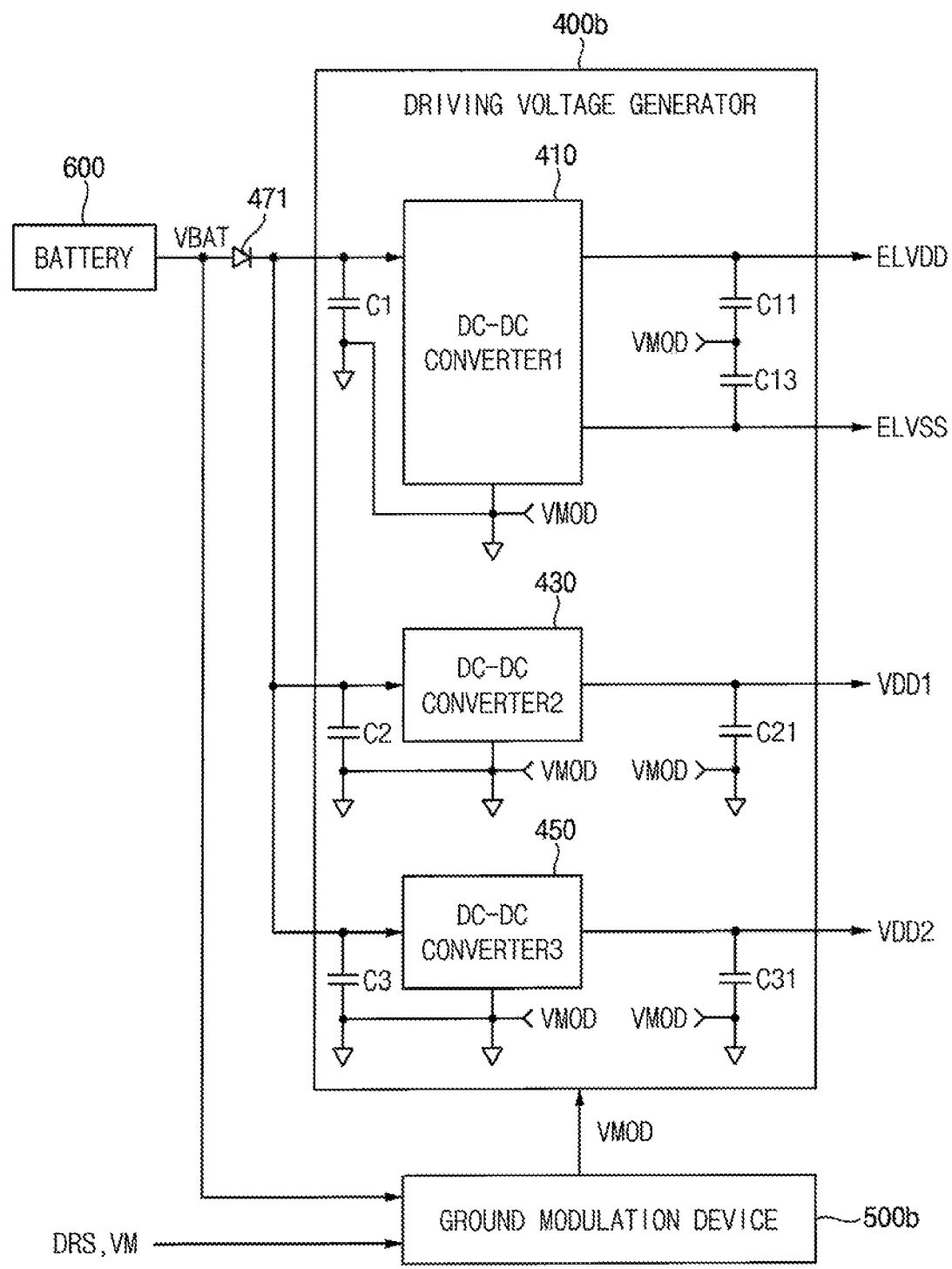

Referring to FIG. 10, the driving voltage generator 400b further includes a plurality of capacitors C1, C2, and C3 and a diode 471, as compared to the driving voltage generator 400a in FIG. 9.

The plurality of capacitors C1, C2, and C3 may be connected to input terminals of each of the plurality of DC-DC converters 410, 430, and 450 to remove high-frequency components included in an input DC voltage VBAT input to the plurality of DC-DC converters 410, 430, and 450.

The ground modulation device 500b may provide a modulated ground voltage VMOD to a plurality of nodes included in the driving voltage generator 400b. In some example embodiments, the ground modulation device 500b may provide the modulated ground voltage VMOD to a ground node of each of the plurality of DC-DC converters 410, 430, and 450 and the plurality of capacitors C1, C2, C3, C11, C13, C21, and C31. In this case, the ground modulation device 500b may remove parasitic capacitances formed between touch electrodes included in the touch screen panel 110 and the display panel 130 based on the modulated ground voltage. The ground modulation device 500 may provide a current to the driving voltage generator 400b. The current provided to the driving voltage generator 400b may have a magnitude substantially same as that of a current output from the ground node of each of the plurality of DC-DC converters 410, 430, and 450 and the plurality of capacitors C1, C2, C3, C11, C13, C21, and C31 to the ground modulation device 500b.

The ground modulation device 500 may provide a current to the driving voltage generator 400. Additional details will be described below with reference to FIGS. 2 and 18. The current provided to the driving voltage generator 400 may have a magnitude substantially the same as that of a current output from the driving voltage generator 400 to the ground modulation device 500.

The diode 471 may block a reverse current that may flow from input terminals of the plurality of DC-DC converters 410, 430, and 450 as the modulated ground voltage VMOD is provided to the ground node of each of the plurality of capacitors C1, C2, and C3.

Figure 11:
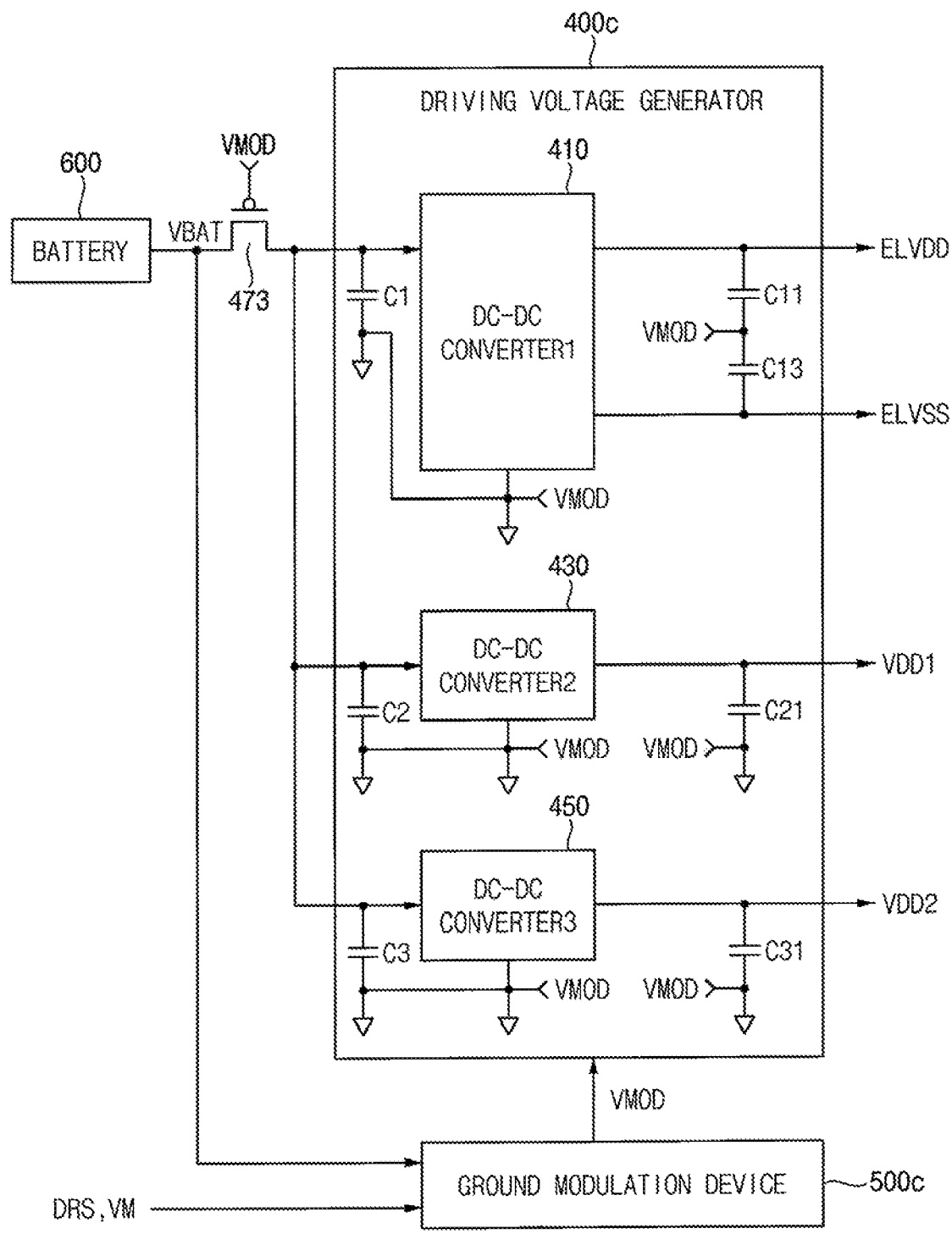

Referring to FIG. 11, the driving voltage generator 400c may include an input switch 473 in place of the diode 471 of the driving voltage generator 400b in FIG. 10.

The plurality of capacitors C1, C2, and C3 may be connected to input terminals of each of a plurality of DC-DC converters 410, 430, and 450 to remove high-frequency components included in input DC voltage VBAT input to the plurality of DC-DC converters 410, 430, and 450.

The ground modulation device 500c may provide a modulated ground voltage VMOD to a plurality of nodes included in the driving voltage generator 400c. In some example embodiments, the ground modulation device 500c may provide the modulated ground voltage VMOD to a ground node of each of the plurality of DC-DC converters 410, 430, and 450 and the plurality of capacitors C1, C2, C3, C11, C13, C21, and C31. In this case, the ground modulation device 500c may remove parasitic capacitances formed between touch electrodes included in the touch screen panel 110 and the display panel 130 based on the modulated ground voltage. The ground modulation device 500 may provide a current to the driving voltage generator 400b. The current provided to the driving voltage generator 400b may have a magnitude substantially the same as that of a current output from the ground node of each of the plurality of DC-DC converters 410, 430, and 450 and the plurality of capacitors C1, C2, C3, C11, C13, C21, and C31 to the ground modulation device 500b.

The input switch 473 may receive the modulated ground voltage VMOD (or a scaled modulated ground voltage VMOD' obtained by scaling the modulated ground voltage VMOD) as a gate voltage, and may be connected between output terminal of battery 600 and input terminals of each of the plurality of DC-DC converters 410, 430, and 450.

The input switch 473 may block a reverse current that may flow from input terminals of the plurality of DC-DC converters 410, 430, and 450 as the modulated ground voltage (or the scaled modulated ground voltage VMOD') is provided to the ground node of each of the plurality of capacitors C1, C2, and C3.

Figure 12:
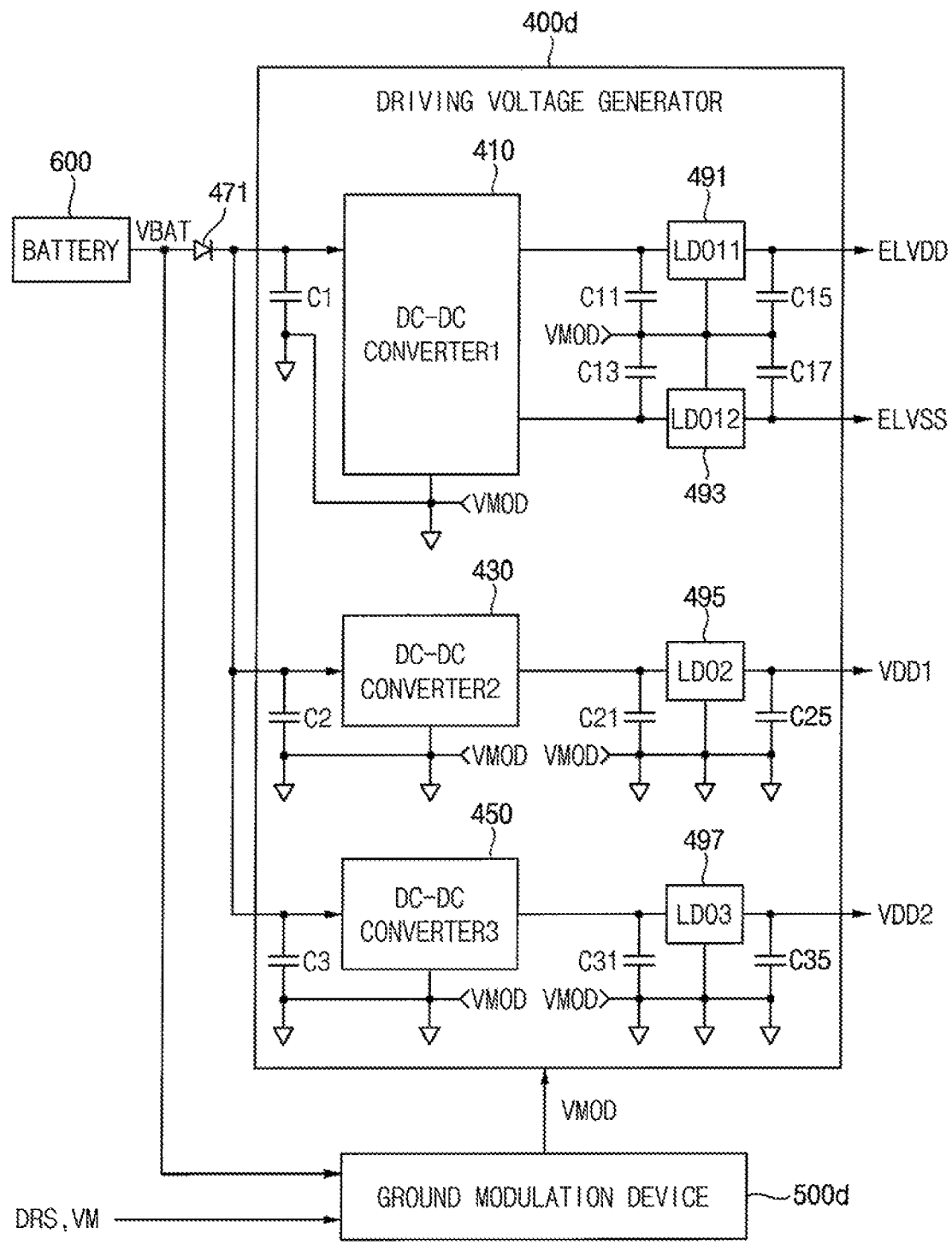

Referring to FIG. 12, the driving voltage generator 400d may further include a plurality of low dropout (LDO)

regulators 491, 493, 495, and 497 and additional capacitors C15, C17, C25, and C35, as compared to the driving voltage generator 400b in FIG. 10.

The plurality of capacitors C1, C2, and C3 may be connected to input terminals of each of a plurality of DC-DC converters 410, 430, and 450 to remove high-frequency components included in input DC voltage VBAT input to the plurality of DC-DC converters 410, 430, and 450.

The ground modulation device 500d may provide a modulated ground voltage VMOD to a plurality of nodes included in the driving voltage generator 400d. In some example embodiments, the ground modulation device 500d may provide the modulated ground voltage VMOD to a ground node of each of the plurality of DC-DC converters 410, 430, and 450, the plurality of capacitors C1, C2, C3, C11, C13, C15, C17, C21, C25, C31, and C35 and the plurality of LDO regulators 491, 493, 495, and 497. In this case, the ground modulation device 500d may remove parasitic capacitances formed between touch electrodes included in the touch screen panel 110 and the display panel 130 based on the modulated ground voltage. The ground modulation device 500d may provide a current to the driving voltage generator 400d. The current provided to the driving voltage generator 400d may have a magnitude substantially the same as that of a current output from the ground node of each of the plurality of DC-DC converters 410, 430, and 450, the plurality of capacitors C1, C2, C3, C11, C13, C15, C17, C21, C25, C31, and C35 and the plurality of LDO regulators 491, 493, 495, and 497.

The diode 471 may block a reverse current that may flow from input terminals of the plurality of DC-DC converters 410, 430, and 450 as the modulated ground voltage (or the scaled modulated ground voltage VMOD') is provided to the ground node of each of the plurality of capacitors C1, C2, and C3.

Figure 13:
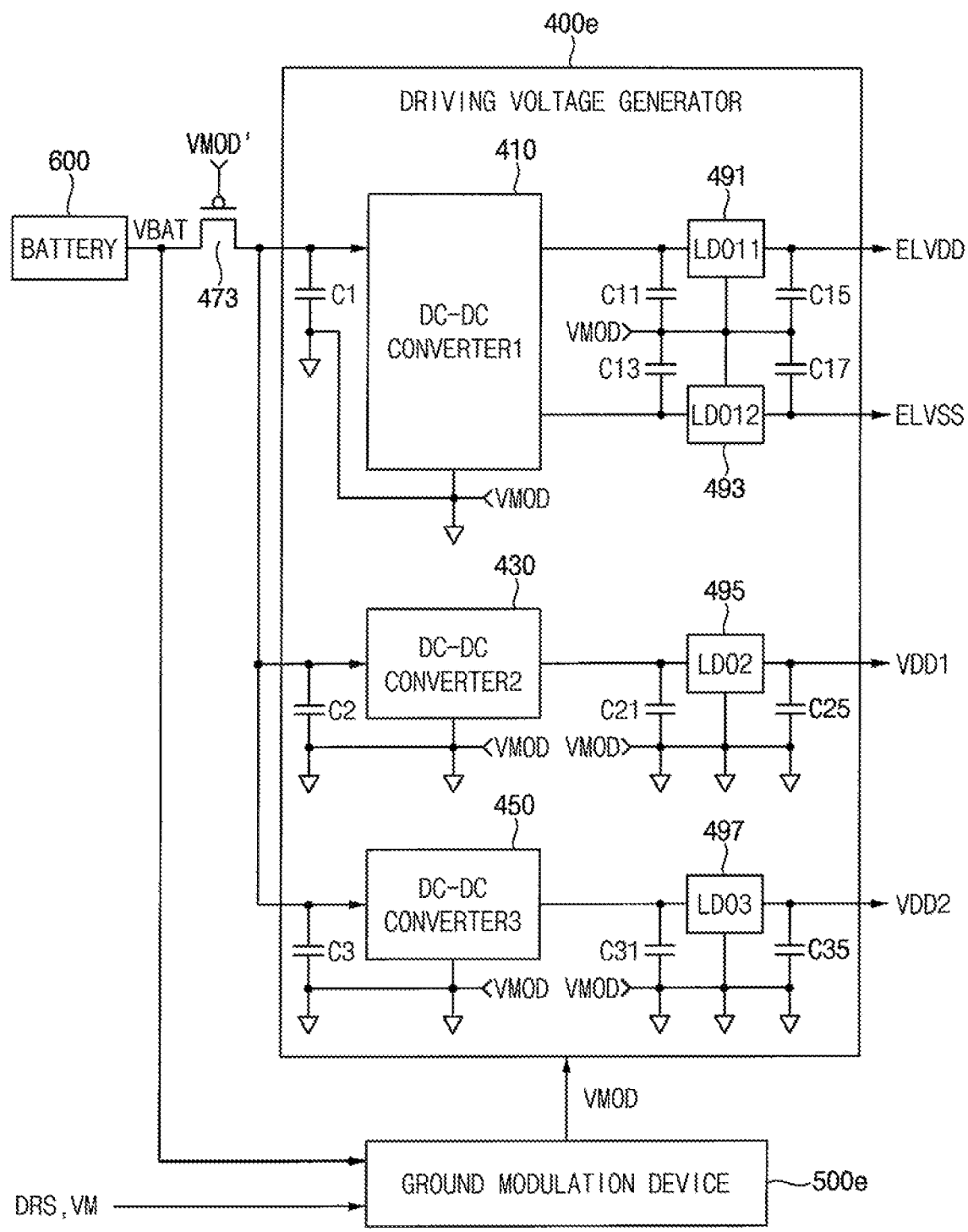

Referring to FIG. 13, the driving voltage generator 400e may include an input switch 473 in place of the diode 471 of the driving voltage generator 400d in FIG. 12.

The plurality of capacitors C1, C2, and C3 may be connected to input terminals of each of a plurality of DC-DC converters 410, 430, and 450 to remove high-frequency components included in input DC voltage VBAT input to the plurality of DC-DC converters 410, 430, and 450.

The ground modulation device 500e may provide a modulated ground voltage VMOD to a plurality of nodes included in the driving voltage generator 400d. In some example embodiments, the ground modulation device 500e may provide the modulated ground voltage VMOD to a ground node of each of the plurality of DC-DC converters 410, 430, and 450, the plurality of capacitors C1, C2, C3, C11, C13, C15, C17, C21, C25, C31, and C35 and the plurality of LDO regulators 491, 493, 495, and 497. In this case, the ground modulation device 500e may remove parasitic capacitances formed between touch electrodes included in the touch screen panel 110 and the display panel 130 based on the modulated ground voltage. The ground modulation device 500d may provide a current to the driving voltage generator 400d. The current provided to the driving voltage generator 400d may have a magnitude substantially the same as that of a current output from the ground node of each of the plurality of DC-DC converters 410, 430, and 450, the plurality of capacitors C1, C2, C3, C11, C13, C15, C17, C21, C25, C31, and C35 and the plurality of LDO regulators 491, 493, 495, and 497.

The input switch 473 may receive the modulated ground voltage VMOD (or the scaled modulated ground voltage VMOD' obtained by scaling the modulated ground voltage VMOD) as a gate voltage, and may be connected between output terminal of battery 600 and input terminals of each of the plurality of DC-DC converters 410, 430, and 450

The input switch 473 may block a reverse current that may flow from input terminals of the plurality of DC-DC converters 410, 430, and 450 as the modulated ground voltage (or the scaled modulated ground voltage VMOD') is provided to the ground node of each of the plurality of capacitors C1, C2, and C3.

Figure 14A:
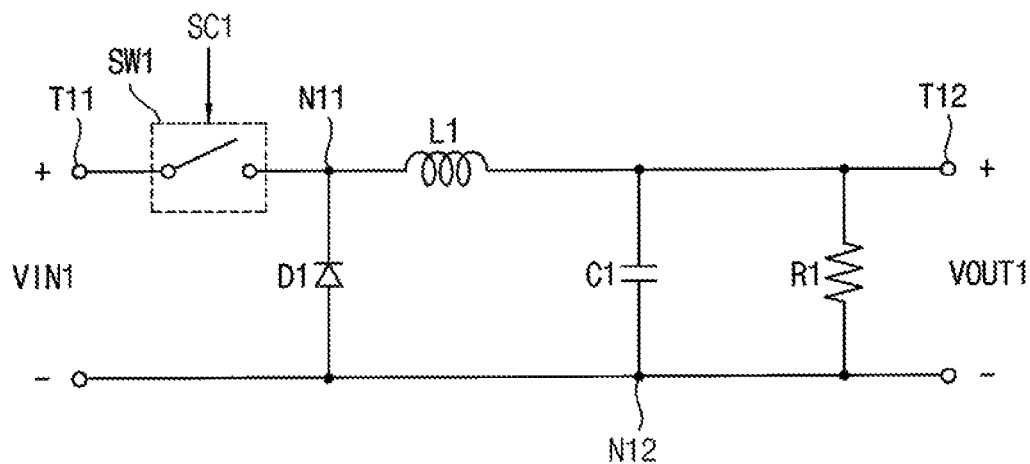
FIGS. 14A, 14B, and 14C are circuit diagrams illustrating an example of a DC-DC converter or a regulator included in a driving voltage generator in FIGS. 9, 10, 11, 12, and 13.
Figure 14B:
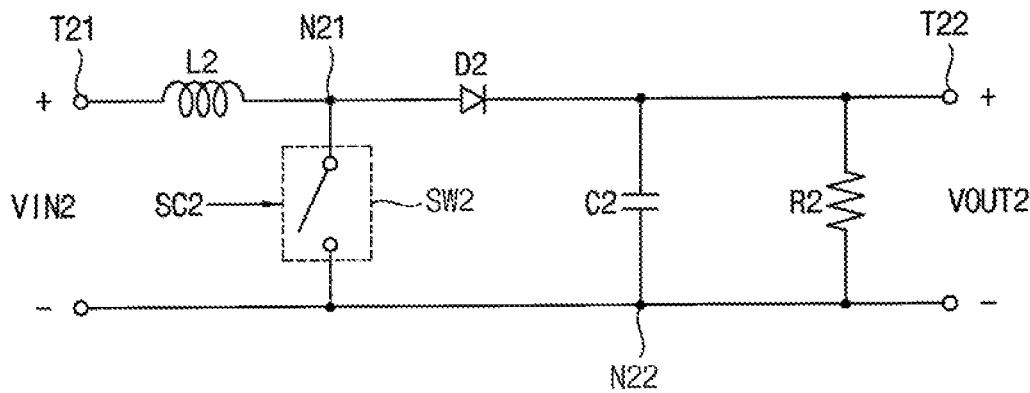
Figure 14C:
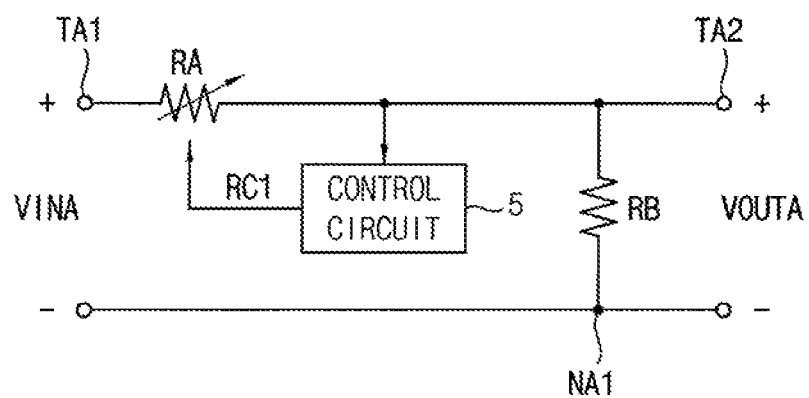

FIGS. 14A, 14B, and 14C are circuit diagrams illustrating an example of a DC-DC converter or a regulator included in a driving voltage generator in FIGS. 9, 10, 11, 12, and 13.

In FIGS. 14A and 14B, examples of a switching regulator are illustrated. In FIG. 14C, an example of a linear regulator is illustrated.

The switching regulator may include a DC-DC converter in which both an input voltage and an output voltage are DC voltages. The DC-DC converter may be one of the plurality of DC-DC converters 410, 430, and 450 described above with reference to FIGS. 9, 10, 11, 12, and 13, and may include a buck converter (or a step-down converter), a boost converter (or a step-up converter), a buck-boost converter in which the buck converter and the boost converter are combined, an isolated DC-DC converter, and the like.

Referring to FIG. 14A, a buck converter, which is a type of the DC-DC converter, may include a switch SW1, a diode D1, an inductor L1, a capacitor C1, and a resistor R1.

The switch SW1 may be connected between a first terminal T11 and a third node N11, and may be turned on or off in response to a switch control signal SC1. The diode D1 may be connected between the third node N11 and a fourth node N12. The inductor L1 may be connected between the third node N11 and a second terminal T12. The capacitor C1 and the resistor R1 may be connected in parallel between the second terminal T12 and the fourth node N12. In the buck converter, an output voltage VOUT1 between the second terminal T12 and the fourth node N12 may be less than an input voltage VIN1 between the first terminal T11 and the fourth node N12.

Referring to FIG. 14B, a boost converter, which is another type of the DC-DC converter, may include an inductor L2, a switch SW2, a diode D2, a capacitor C2, and a resistor R2.

The inductor L2 may be connected between a first terminal T21 and a third node N21. The switch SW2 may be connected between the first node N21 and a second node N22, and may be turned on or off in response to a switch control signal SC2. The diode may be connected between the first node N21 and the second terminal T22. The capacitor C2 and the resistor R2 may be connected in parallel between the second terminal T22 and the fourth node N22. In the boost converter, an output voltage VOUT2 between the second terminal T22 and the fourth node N22 may be greater than an input voltage VIN2 between the first terminal T21 and the fourth node N22.

In some example embodiments, the switch control signal SC1 in FIG. 14A and/or the switch control signal SC2 in FIG. 14B may be generated based on a pulse width modulation (PWM) scheme or a pulse frequency modulation (PFM) scheme. In some example embodiments, the switch control signal SC1 in FIG. 14A and/or SC2 in FIG. 14B may be generated based on a feedback signal that is fed back from the second terminal T12 in FIG. 14A or the second terminal T22 in FIG. 14B.

A linear regulator may include a shunt regulator, a series regulator, a LDO regulator, and the like. The LDO regulator may be one of the plurality of LDO regulators 491, 493, 495, and 497 described above with reference to FIGS. 12 and 13.

Referring to FIG. 14C, a linear regulator may include resistors RA and RB and a control circuit 5.

The resistor RA may be connected between a first terminal TA1 and a second terminal TA2, and may be a variable resistor. The resistor RB may be connected between the second terminal TA2 and a third node NA1. The control circuit 5 may generate a resistor control signal RC1 that adjusts a resistance value of the resistor RA based on a feedback signal that is fed back from the second terminal TA2. In the linear regulator, an output voltage VOUTA between the second terminal TA2 and the third node NA1 may be less than an input voltage VINA between the first terminal TA1 and the third node NA1.

Although not illustrated in FIGS. 14A, 14B, and 14C, configurations of the switching regulator and the linear regulation may be variously changed according to example embodiments.

Figure 15:
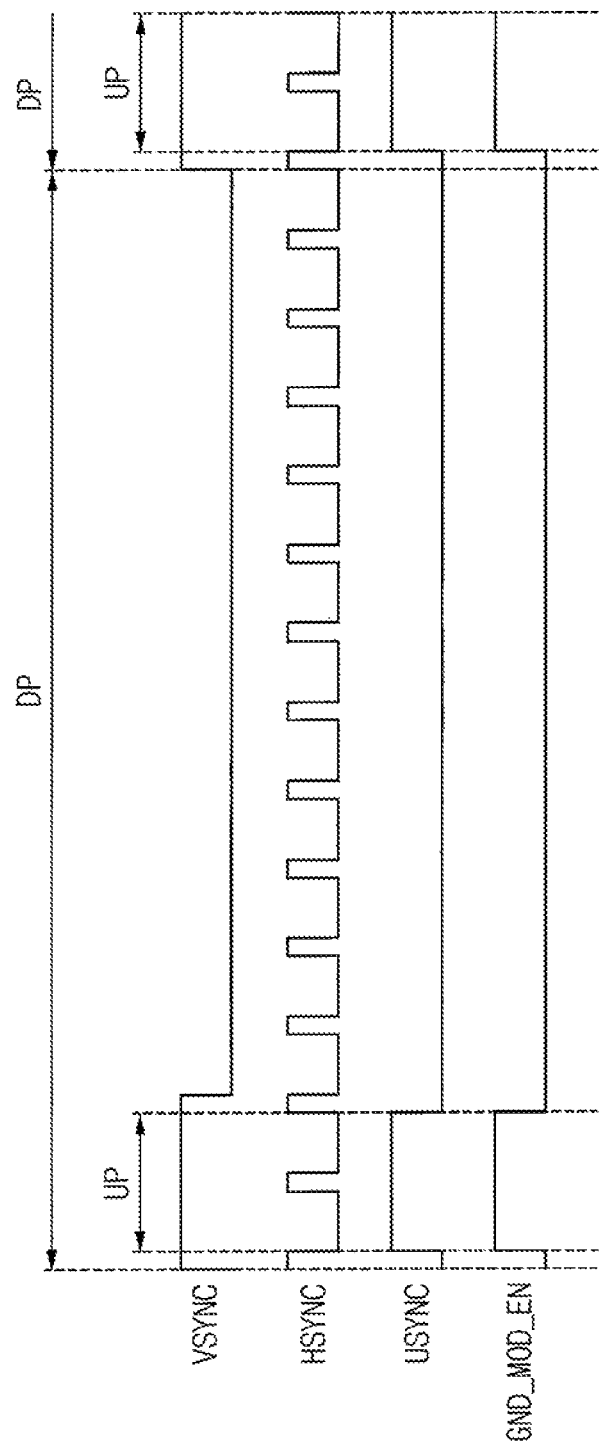
FIGS. 15 and 16 are diagrams for describing an operation of a ground modulation device in FIG. 1.
Figure 16:
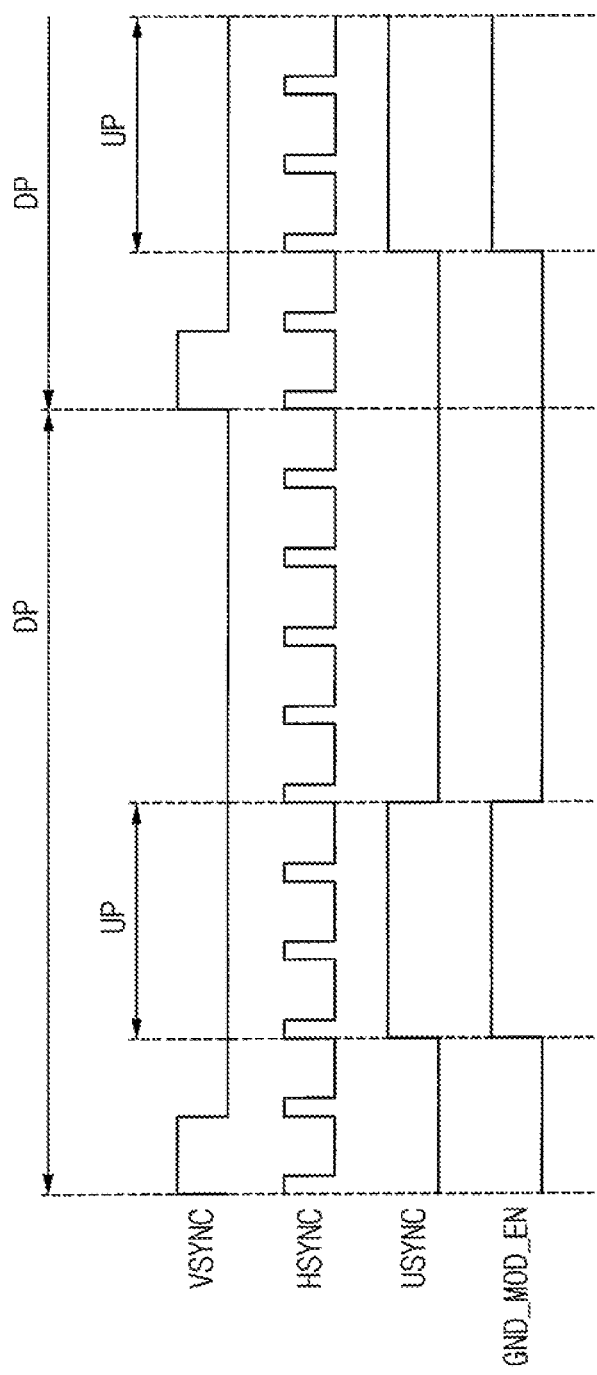

FIGS. 15 and 16 are diagrams for describing an operation of a ground modulation device in FIG. 1.

In FIGS. 15 and 16, a plurality of time periods DPs and UPs, a plurality of synchronization signals VSYNC, HSYNC, and USYNC, and a device enable signal GND_MOD_EN are illustrated.

A first time period DP may be a display period in which the display driver IC 300 in FIG. 1 drives the display panel 130 in FIG. 1. A second time period UP may be an uplink period among a touch driving periods in which the touch screen controller 200 in FIG. 1 drives the touch screen panel 110 in FIG. 1.

In some example embodiments, a touch display system including a ground modulation device may allow a direct contact or a proximity contact using a touch pen as a touch input, and the touch pen may be limited to an active pen.

In the display period, the display driver IC 300 may apply a display signal representing image data to a plurality of data lines included in the display panel, and may apply a gate signal to a plurality of gate lines.

In the uplink period, a touch screen controller may transmit a signal from a touch screen panel to the active pen. The uplink period may be distinguished from a downlink period, in which the active pen may transmit a signal from the active pen to the touch screen panel.

Referring to FIGS. 1 and 15, the first time period DP includes the second time period UP. In some example embodiments, a display driver IC 300 may provide the vertical synchronization signal VSYNC and the horizontal synchronization signal HSYNC to the display panel 130 during the first time period DP, and the touch screen controller 200 may provide the uplink synchronization signal USYNC to the touch screen panel 110. In some example embodiments, the uplink synchronization signal USYNC may be included in a period in which the vertical synchronization signal VSYNC maintains a high level. While the uplink synchronization signal USYNC maintain the high level, the device enable signal GND_MOD_EN, which is for activating the ground modulation device 500 in FIG. 1, may transition to the high level.

Referring to FIGS. 1 and 16, a first time period DP includes a second time period UP. In some example embodiments, the uplink synchronization signal USYNC may be included in a period in which the vertical synchronization signal VSYNC maintains a low level. While the uplink synchronization signal USYNC maintains the high level, the device enable signal GND_MOD_EN for activating a ground modulation device 500 in FIG. 1 may transition to the high level. For example, when the touch display system 10 allows a touch input by an active pen, the ground modulation device 500 may provide the modulated ground voltage VMOD to a portion of a plurality of nodes included in the driving voltage generator 400 during the uplink period in which a signal is transmitted from the touch screen panel to the active pen. In this case, the ground modulation device 500 may remove parasitic capacitances generated between touch electrodes included in the touch screen panel 110 and the display panel 130 based on the modulated ground voltage VMOD. The ground modulation device 500 may provide a current to the driving voltage generator 400. The current provided to the driving voltage generator 400 may have a magnitude substantially the same as that of a current output from the driving voltage generator 400 to the ground modulation device 500.

Figure 17:
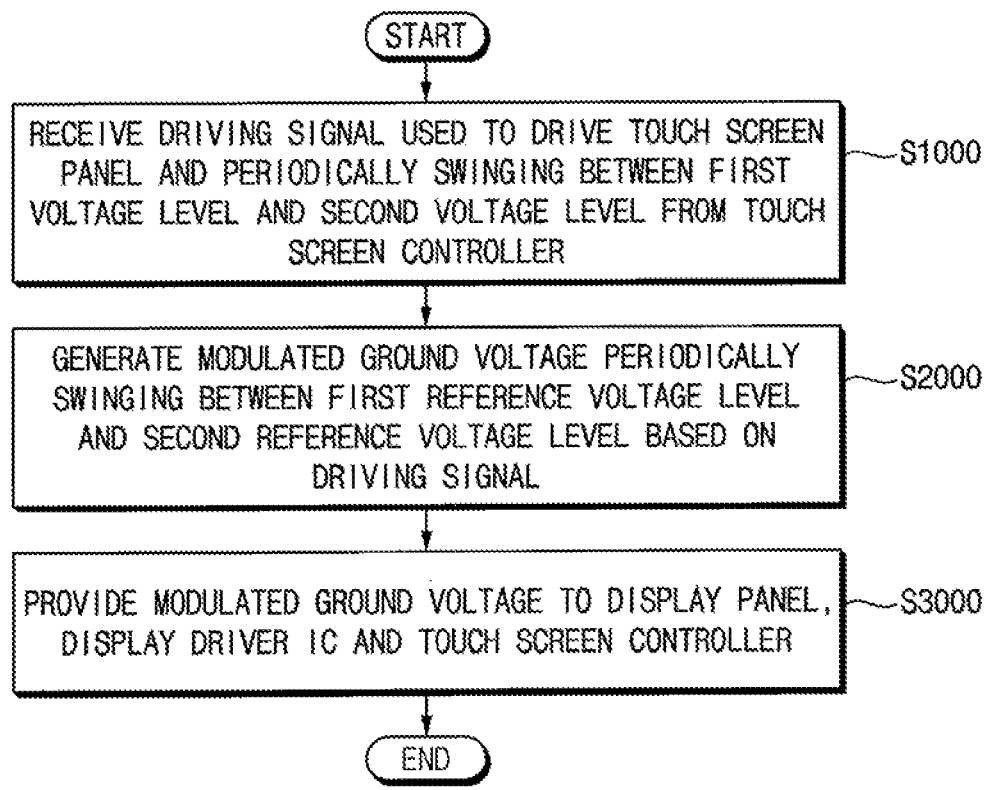
FIG. 17 is a flowchart illustrating a method of operating a ground modulation device in FIG. 1.

FIG. 17 is a flowchart illustrating a method of operating a ground modulation device in FIG. 1.

Referring to FIG. 17, in a method of operating the ground modulation device 500, a driving signal, which is used to drive a touch screen panel and periodically swings, is received from a touch screen controller (S1000).

In some example embodiments, the touch screen panel may be implemented as a capacitive type. For example, the touch screen panel 110 may be implemented in an On-Cell type. When the touch screen panel is implemented in the On-Cell type, a transmission electrode (Tx electrode) and a reception electrode (Rx electrode) may be formed on the display panel. In some example embodiments, the transmission electrode and the reception electrode may be formed on an upper surface of an encapsulation glass.

The touch screen panel 110 may include a plurality of touch electrodes, and the plurality of touch electrodes may be capacitive touch electrodes. The display panel 130 may be implemented as an Organic LED (OLED) display, but example embodiments are not limited thereto. The display panel 130 may be implemented as a liquid crystal display (LCD), a light emitting diode (LED) display, an active-matrix OLED (AMOLED) display, a flexible display, and other types of flat panel displays.

A modulated ground voltage, which periodically swings between a first reference voltage level and a second reference voltage level, is generated based on the driving signal (S2000). The modulated ground voltage is provided to each of the display panel, the display driver IC, and the touch screen controller (S3000).

In some example embodiments, the modulated ground voltage may be generated by a ground modulation device, and the ground modulation device may receive a plurality of DC voltages and receive the driving signal from a touch screen controller. In this case, the ground modulation device may generate the modulated ground voltage based on the plurality of DC voltages and the driving signal, and provide the modulated ground voltage to the driving voltage generator, the touch screen controller and the display driver IC.

In some example embodiments, the ground modulation device may provide the modulated ground voltage to a portion of a plurality of nodes included in the driving voltage generator. In this case, the ground modulation device may remove parasitic capacitances generated between touch electrodes included in the touch screen panel and the display panel based on the modulated ground voltage. The ground modulation device may provide a current to the driving voltage generator. The current provided to the driving voltage generator may have a magnitude substantially the same as that of a current output from the driving voltage generator to the ground modulation device.

Figure 18:
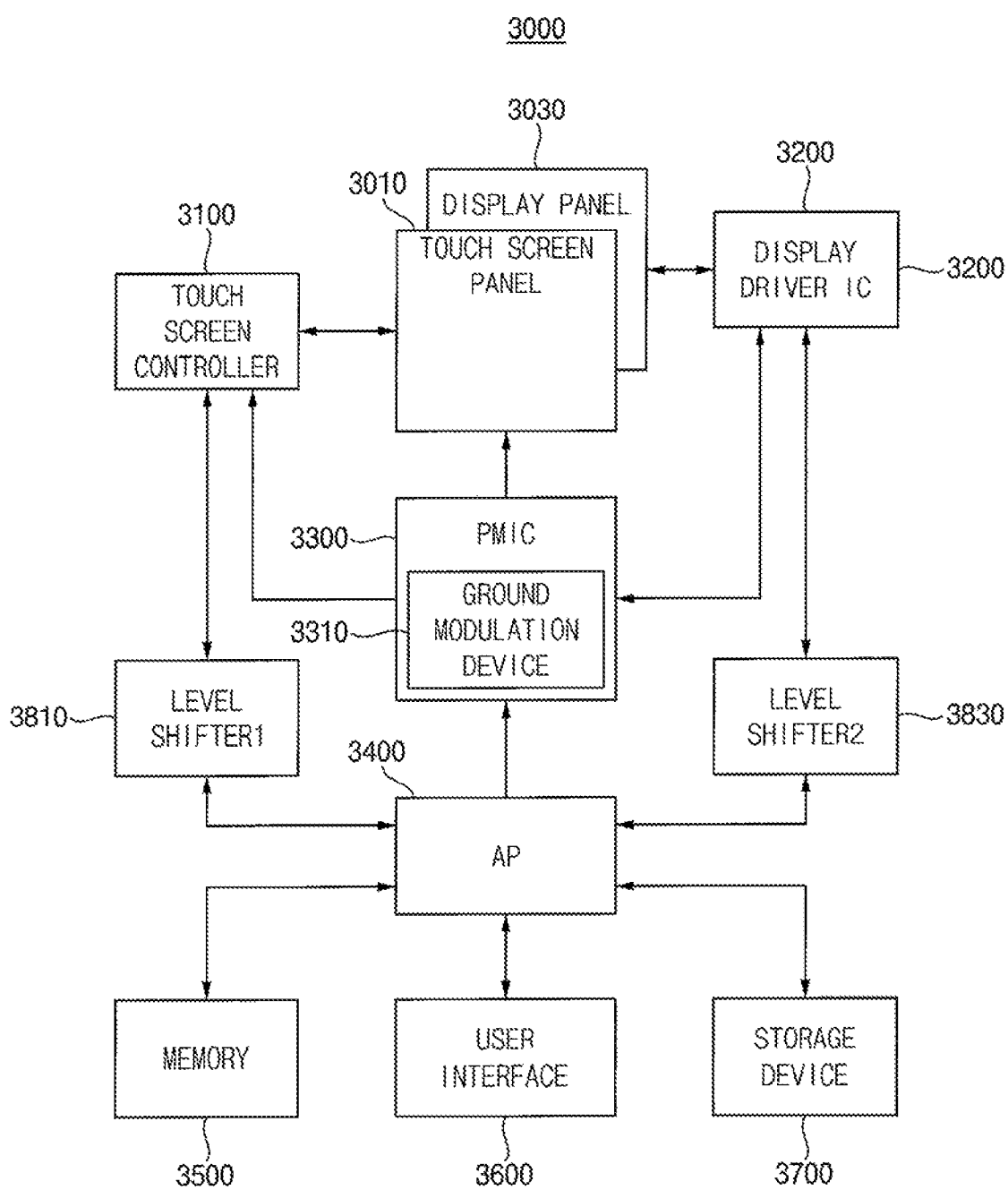
FIG. 18 is a block diagram illustrating an example of a touch display system according to example embodiments.

FIG. 18 is a block diagram illustrating an example of a touch display system according to example embodiments.

Referring to FIG. 18, a touch display system 3000 may include a touch screen panel 3010, a display panel 3030, a touch screen controller 3100, a display driver IC 3200, a power management IC (PMIC) 3300, an application processor 3400, a memory 3500, a user interface 3600, a storage device 3700 and a plurality of level shifters, e.g., a first level shifter 3810 and a second level shifter 3830. The PMIC 3300 may include a ground modulation device 3310.

In some example embodiments, a portion of components 3010, 3030, 3100, 3200, 3300, and 3310 included in the touch display system 3000 may correspond to the components 110, 130, 200, 300, 400, 500 and 600 in FIG. 1. For example, the touch screen panel 3010 may correspond to the touch screen panel 110, and the display panel 3030 may correspond to the display panel 130, respectively. The touch screen controller 3100 may correspond to the touch screen controller 200, and the display driver IC 3200 may correspond to the display driver IC 300, respectively. The PMIC 3300 may correspond to the driving voltage generator 400, the ground modulation device 500, and the battery 600. The display panel 3030 and the display driver IC 3200 may configure a display system. The touch screen panel 3010 and the touch screen panel controller may configure a touch system.

The application processor 3400 may control overall operations of components included in the touch display system 3000. In some example embodiments, the application processor 3400 may execute applications that provide Internet browsers, games, videos, and the like. In some example embodiments, the application processor 3400 may include one processor core or a plurality of processor cores. For example, the application processor 3400 may include a multi-core such as a dual-core, a quad-core, a hexa-core, and the like. The application processor 3400 may further include a cache memory located inside or outside the application processor 3400.

The memory 3500 may store data used for operations of the touch display system 3000. For example, the memory 3500 may store a boot image for booting the touch display system 3000, and may store data transmitted/received to/from an external device. For example, the memory 3500 may be implemented as a volatile memory such as a dynamic random access memory (DRAM), a static random access memory (SRAM), a mobile DRAM, or the like, and may be implemented as a nonvolatile memory such as electrically erasable programmable read-only memory (EEPROM), a flash memory, a phase change random access memory (PRAM), a nano floating gate memory (NFGM), a polymer random access memory (PoRAM), a magnetic random access memory (MRAM), a ferroelectric random access memory (FRAM), or the like.

The user interface 3600 may include one or more input devices such as a keypad, a touch screen, or the like, and/or one or more output devices such as a speaker, a display device, or the like.

The storage device 3700 may store a large amount of image data to be provided on the display panel 3030.

In a manner similar to the manner described above with reference to FIG. 1, a portion of components, e.g., the driving voltage generator, of the touch screen panel 3010, the display panel 3030, the touch screen controller 3100, the display driver IC 3200, and the PMIC 3300 included in the touch display system 3000 may operate in a modulated ground domain, and another portion of components, e.g., the ground modulation device 3310 of the PMIC 3300, the application processor 3400, the memory 3500, the user interface 3600, and the storage device 3700 may operate in a system ground domain. In this case, each of the plurality of level shifters 3810 and 3830 may compensate for a difference in voltage level occurring between the modulation ground domain and the system ground domain.

In some example embodiments, the first level shifter 3810 may compensate for a difference in voltage level occurring between the touch screen controller 3100 and the application processor 3400, and the second level shifter 3830 may compensate for a difference in voltage level occurring between the display driver IC 3200 and the application processor 3400. However, the number and connection relationship of the plurality of level shifters 3810 and 3830 are merely examples, and example embodiments are not limited thereto.

As described above, a touch display system performing ground modulation according to example embodiments may provide a modulated ground voltage to a portion of a plurality of nodes included in a driving voltage generator. A ground modulation device for generating the modulated ground voltage may remove parasitic capacitances generated between touch electrodes included in a touch screen panel and a display panel based on the modulated ground voltage. The ground modulation device may provide a current to a ground voltage generator. The current provided to the driving voltage generator may have a magnitude substantially the same as that of a current output from the driving voltage generator to the ground modulation device. The ground modulation device may include a reference voltage generator, a dead time generator, and a buffer circuit. The ground modulation device may stably remove the parasitic capacitances using the above configuration.

Embodiments may be applied to any suitable electronic device and system including a display device having a touch screen panel. For example, embodiments may be applied to electronic systems such as a personal computer (PC), a server computer, a data center, a workstation, a laptop, a cellular phone, a smart phone, an MP3 player, a personal multimedia player (PMP), a digital TV, a digital camera, a portable game console, a navigation device, a wearable device, an Internet of Things (IoT) device, an Internet of Everything (IoE) device, an e-book, a virtual reality (VR) device, an augmented reality (AR) device, an electronic system, and the like.

By way of summation and review, in recent times, a touch screen panel mainly uses the capacitive type as the embedded type. Compared to the external type, the embedded type may make a panel thinner and reduce light reflection on a surface of the panel, thereby reducing an amount of power consumed by the panel. The capacitive type may be manufactured in a small size with improved touch sensitivity compared to the resistive type. However, in a touch display system employing the On Cell Type, parasitic capacitances may be formed between the display panel and touch electrodes included in the touch screen panel. As the thickness of the touch screen panel decreases, the parasitic capacitances increase, so that the amount of power consumed by the panel may increase and the touch sensitivity may decrease.

As described above, example embodiments may provide a touch display system that performs ground modulation to reduce an amount of power consumed by a touch screen panel and improve touch sensitivity.

A touch display system performing ground modulation according to embodiments may provide a modulated ground voltage to a portion of a plurality of nodes included in a driving voltage generator. In this case, a ground modulation device for generating the modulated ground voltage may remove parasitic capacitances generated between touch electrodes included in the touch screen panel and the display panel based on the modulated ground voltage. The ground modulation device may provide a current to a ground voltage generator. The current provided to the driving voltage generator may have a magnitude substantially the same as that of a current output from the driving voltage generator to the ground modulation device. The ground modulation device may include a reference voltage generator, a dead time generator, and a buffer circuit. The ground modulation device may stably remove the parasitic capacitances using the above configuration.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch display system, comprising:
   a display driver integrated circuit (IC) configured to drive a display panel;
   a touch screen controller configured to drive a touch screen panel;
   a driving voltage generator configured to provide driving voltages to the display panel, the display driver IC, and the touch screen controller; and
   a ground modulation device configured to receive a driving signal, which is used to drive the touch screen panel and periodically swings between a first reference voltage level and a second reference voltage level, from the touch screen controller, configured to generate a modulated ground voltage, which periodically swings between the first reference voltage level and the second reference voltage level, based on the driving signal, and configured to provide the modulated ground voltage to the display panel, the display driver IC, and the touch screen controller, wherein:
   the touch display system is configured to operate in a display period and a touch pen uplink period, and
   the ground modulation device is configured to provide the modulated ground voltage in the touch pen uplink period.

2. The touch display system as claimed in claim 1, wherein the ground modulation device includes:
   a reference voltage generator configured to receive a first direct current (DC) voltage and a second DC voltage, and configured to output a constant voltage having the first reference voltage level based on the first DC voltage and the second DC voltage;
   a dead time generator configured to generate a first gate control signal and a second gate control signal based on the driving signal; and
   a buffer circuit configured to output the modulated ground voltage based on the first gate control signal and the second gate control signal.

3. The touch display system as claimed in claim 2, wherein the reference voltage generator includes:
   a first operational amplifier configured to amplify a difference between the first DC voltage and a voltage at a first node, to output a third gate control signal;
   a second operational amplifier configured to amplify a difference between the first DC voltage and the voltage at the first node, to output a fourth gate control signal;
   a p-type metal oxide semiconductor (PMOS) transistor configured to receive the third gate control signal as a gate voltage, and connected between the first node and a first power node to which the second DC voltage is applied;
   a n-type metal oxide semiconductor (NMOS) transistor configured to receive the fourth gate control signal as a gate voltage, and connected between the first node and a second power node to which a system ground voltage is applied; and
   a capacitor connected between the second power node and the first node.

4. The touch display system as claimed in claim 2, wherein the dead time generator includes:
   a first clock generator configured to generate the first gate control signal based on the driving signal; and
   a second clock generator configured to generate the second gate control signal based on the driving signal.

5. The touch display system as claimed in claim 4, wherein the dead time generator is configured to control MOS transistors included in the buffer circuit to be non-simultaneously turned on by the first gate control signal and the second gate control signal.

6. The touch display system as claimed in claim 2, wherein the buffer circuit includes:
   a PMOS transistor configured to receive the first gate control signal as a gate voltage, and connected between a second node and a third power node to which the constant voltage is applied; and
   a NMOS transistor configured to receive the second gate control signal as a gate voltage, and connected between the second node and a fourth power node to which a system ground voltage is applied.

7. The touch display system as claimed in claim 1, wherein the driving voltage generator includes:
   a first DC-DC converter configured to generate first driving voltages provided to the display panel;
   a second DC-DC converter configured to generate a second driving voltage provided to the touch screen controller; and
   a third DC-DC converter configured to generate a third driving voltage provided to the display driver IC,
   wherein the ground modulation device is configured to provide the modulated ground voltage to a ground node of each of the first to third DC-DC converters.

8. The touch display system as claimed in claim 7, wherein the driving voltage generator further includes:
   a first capacitor connected between an input terminal of the first DC-DC converter and the ground node;
   a second capacitor connected between an input terminal of the second DC-DC converter and the ground node; and
   a third capacitor connected between an input terminal of the third DC-DC converter and the ground node,
   wherein the ground modulation device is configured to provide the modulated ground voltage to the ground node to which each of the first to third capacitors are connected.

9. The touch display system as claimed in claim 7, wherein the driving voltage generator further includes:
- first low dropout regulators connected to an output terminal of the first DC-DC converter;
- a second low dropout regulator connected to an output terminal of the second DC-DC converter; and
- a third low dropout regulator connected to an output terminal of the third DC-DC converter;
- wherein the ground modulation device is configured to provide the modulated ground voltage to a ground node of each of the first to third low dropout regulators.

10. The touch display system as claimed in claim 1, wherein a magnitude of a current provided from the ground modulation device to the driving voltage generator is configured to be equal to a magnitude of a current output from the driving voltage generator to the ground modulation device.

11. The touch display system as claimed in claim 1, further comprising:
- an application processor configured to provide a vertical synchronization signal and a horizontal synchronization signal to the display driver IC, configured to provide an uplink synchronization signal representing a start time point and an end time point of the touch pen uplink period to the touch screen controller based on the vertical synchronization signal and the horizontal synchronization signal, and configured to provide a ground modulation enable signal for activating the ground modulation device based on the uplink synchronization signal to the ground modulation device.

12. The touch display system as claimed in claim 1, wherein a system ground voltage is configured to be applied to a ground node of the ground modulation device.

13. The touch display system as claimed in claim 1, wherein the ground modulation device is configured to provide the modulated ground voltage to each of the display panel, the display driver IC, and the touch screen controller to remove parasitic capacitances formed between the display panel and touch electrodes included in the touch screen panel.

14. A touch display system, comprising:
- a display system including a display panel and a display driver integrated circuit (IC) configured to drive the display panel;
- a touch system including a touch screen panel and a touch screen controller configured to drive the touch screen panel;
- a power management IC configured to supply power to the display system and the touch system; and
- an application processor configured to control the display system, the touch system, and the power management IC, wherein:
- the power management IC includes:
  - a driving voltage generator configured to provide driving voltages to the display panel, the display driver IC, and the touch screen controller; and
  - a ground modulation device configured to receive a driving signal, which is used to drive the touch screen panel and periodically swings between a first reference voltage level and a second reference voltage level, from the touch screen controller, configured to generate a modulated ground voltage, which periodically swings between the first reference voltage level and the second reference voltage level, based on the driving signal, and configured to provide the modulated ground voltage to the display panel, the display driver IC, and the touch screen controller, and
- a magnitude of a current provided by the ground modulation device to the driving voltage generator is configured to be equal to a magnitude of a current output from the driving voltage generator to the ground modulation device.

15. The touch display system as claimed in claim 14, wherein the ground modulation device includes:
- a reference voltage generator configured to receive a first direct current (DC) voltage and a second DC voltage, and configured to output a constant voltage having the first reference voltage level based on the first DC voltage and the second DC voltage;
- a dead time generator configured to generate a first gate control signal and a second gate control signal based on the driving signal; and
- a buffer circuit configured to output the modulated ground voltage based on the first gate control signal and the second gate control signal.

16. The touch display system as claimed in claim 14, wherein:
- the modulated ground voltage having the second reference voltage level is configured to be applied to a ground node of each of the display panel, the display driver IC, the touch screen controller, and the driving voltage generator, and
- a system ground voltage is configured to be applied to a ground node of the ground modulation device.

17. The touch display system as claimed in claim 14, wherein the ground modulation device is configured to provide the modulated ground voltage to each of the display panel, the display driver IC, and the touch screen controller to remove parasitic capacitances formed between the display panel and touch electrodes included in the touch screen panel.

18. A touch display system, comprising:
- a display driver integrated circuit (IC) configured to drive a display panel;
- a touch screen controller configured to drive a touch screen panel;
- a driving voltage generator including a plurality of direct current-direct current (DC-DC) converters and a plurality of capacitors, and configured to provide a plurality of driving voltages to the display panel, the display driver IC, and the touch screen controller, respectively, the plurality of DC-DC converters generating the plurality of driving voltages, the plurality of capacitors being connected between a ground node and input terminals of the plurality of DC-DC converters; and
- a ground modulation device configured to receive a driving signal, which is used to drive the touch screen panel and periodically swings between a first reference voltage level and a second reference voltage level, from the touch screen controller, configured to generate a modulated ground voltage, which periodically swings between the first reference voltage level and the second reference voltage level, based on the driving signal, and configured to provide the modulated ground voltage to a ground node of each of the display panel, the display driver IC, and the touch screen controller,
- wherein the ground modulation device includes:
  - a reference voltage generator configured to receive a first DC voltage and a second DC voltage, and configured to output a constant voltage having the first reference voltage level based on the first DC voltage and the second DC voltage;
a dead time generator configured to generate a first gate control signal and a second gate control signal based on the driving signal; and
a buffer circuit configured to output the modulated ground voltage based on the first gate control signal and the second gate control signal.

* * * * *